US010282757B1

(12) United States Patent
Bitoun et al.

(10) Patent No.: US 10,282,757 B1
(45) Date of Patent: May 7, 2019

(54) TARGETED AD BUYS VIA MANAGED RELATIONSHIPS

(71) Applicant: A9.com, Inc., Palo Alto, CA (US)

(72) Inventors: Lionel Bitoun, Palo Alto, CA (US); Matthew Hamilton Battles, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 721 days.

(21) Appl. No.: 13/762,577

(22) Filed: Feb. 8, 2013

(51) Int. Cl.
*G06Q 30/02* (2012.01)

(52) U.S. Cl.
CPC ..... *G06Q 30/0275* (2013.01); *G06Q 30/0251* (2013.01); *G06Q 30/0255* (2013.01); *G06Q 30/0271* (2013.01)

(58) Field of Classification Search
None
See application file for complete search history.

(56) References Cited

U.S. PATENT DOCUMENTS

| | | | |
|---|---|---|---|
| 6,606,657 B1* | 8/2003 | Zilberstein | G06F 11/3495 709/224 |
| 6,959,319 B1* | 10/2005 | Huang | G06F 17/30867 705/14.73 |
| 2001/0054001 A1* | 12/2001 | Robinson | 705/14 |
| 2006/0224445 A1* | 10/2006 | Axe | G06Q 30/02 705/14.69 |
| 2006/0271669 A1* | 11/2006 | Bouguenon | G06F 17/30867 709/224 |
| 2008/0270223 A1* | 10/2008 | Collins et al. | 705/10 |
| 2010/0198688 A1* | 8/2010 | Gonen et al. | 705/14.54 |
| 2010/0235220 A1* | 9/2010 | Guha | G06Q 30/00 705/7.31 |
| 2011/0022938 A1* | 1/2011 | Wilkinson | G06F 17/3089 715/205 |
| 2011/0106796 A1* | 5/2011 | Svaic | G06F 17/30873 707/728 |
| 2011/0213822 A1* | 9/2011 | Yavilevich | G06Q 30/02 709/202 |
| 2011/0313857 A1* | 12/2011 | Nice et al. | 705/14.53 |
| 2012/0166520 A1* | 6/2012 | Lindsay | G06Q 30/0241 709/203 |
| 2012/0179543 A1* | 7/2012 | Luo et al. | 705/14.54 |

(Continued)

OTHER PUBLICATIONS

Mobile Agents and the Future of the Internet, Kotz et al., ACM Operating Systems Review 33(3), Aug. 1999, pp. 7-13.*

*Primary Examiner* — David J Stoltenberg
(74) *Attorney, Agent, or Firm* — Eversheds Sutherland (US) LLP

(57) ABSTRACT

Certain embodiments herein relate to targeting ads for purchase by leveraging relationships between advertisers and publishers. Ad campaigns may be established between an ad device associated with an advertiser and publisher devices associated with publishers. An ad campaign for displaying an ad may be determined based on information associated with a communication session from a user device (e.g., as identified in a cookie) and/or information associated with a user utilizing the user device. An ad device may activate one or more established ad campaigns as part of an auction process, and may subsequently provide one or more ads for displaying on a web page according to attributes that may characterize the ad campaigns.

13 Claims, 12 Drawing Sheets

(56) References Cited

U.S. PATENT DOCUMENTS

| | | | | |
|---|---|---|---|---|
| 2012/0271691 A1* | 10/2012 | Hammad | ............... | G06Q 10/10 705/14.17 |
| 2013/0013646 A1* | 1/2013 | Datar | ................... | G06Q 30/02 707/802 |
| 2013/0159094 A1* | 6/2013 | McClelland | ....... | G06Q 30/0269 705/14.49 |
| 2013/0159113 A1* | 6/2013 | McClelland | ........... | G06Q 30/02 705/14.66 |
| 2013/0332267 A1* | 12/2013 | Filev | ..................... | G06Q 30/02 705/14.46 |
| 2014/0074627 A1* | 3/2014 | Kucharz et al. | ........... | 705/14.72 |

\* cited by examiner

TARGETED AD BUYS VIA MANAGED RELATIONSHIPS

BACKGROUND

Advertisers may purchase advertisement ("ad") inventory from various publishers of content, such as web sites, for the opportunity to present ads to viewers of such content. Existing techniques for purchasing ads may relate to bulk purchases of ads. Many of the ads purchased in bulk, however, may ignore information associated with viewers of the content, and thus, may be less likely to result in sales of the advertised products or services. Thus, existing ad purchases may be wasteful.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1A:
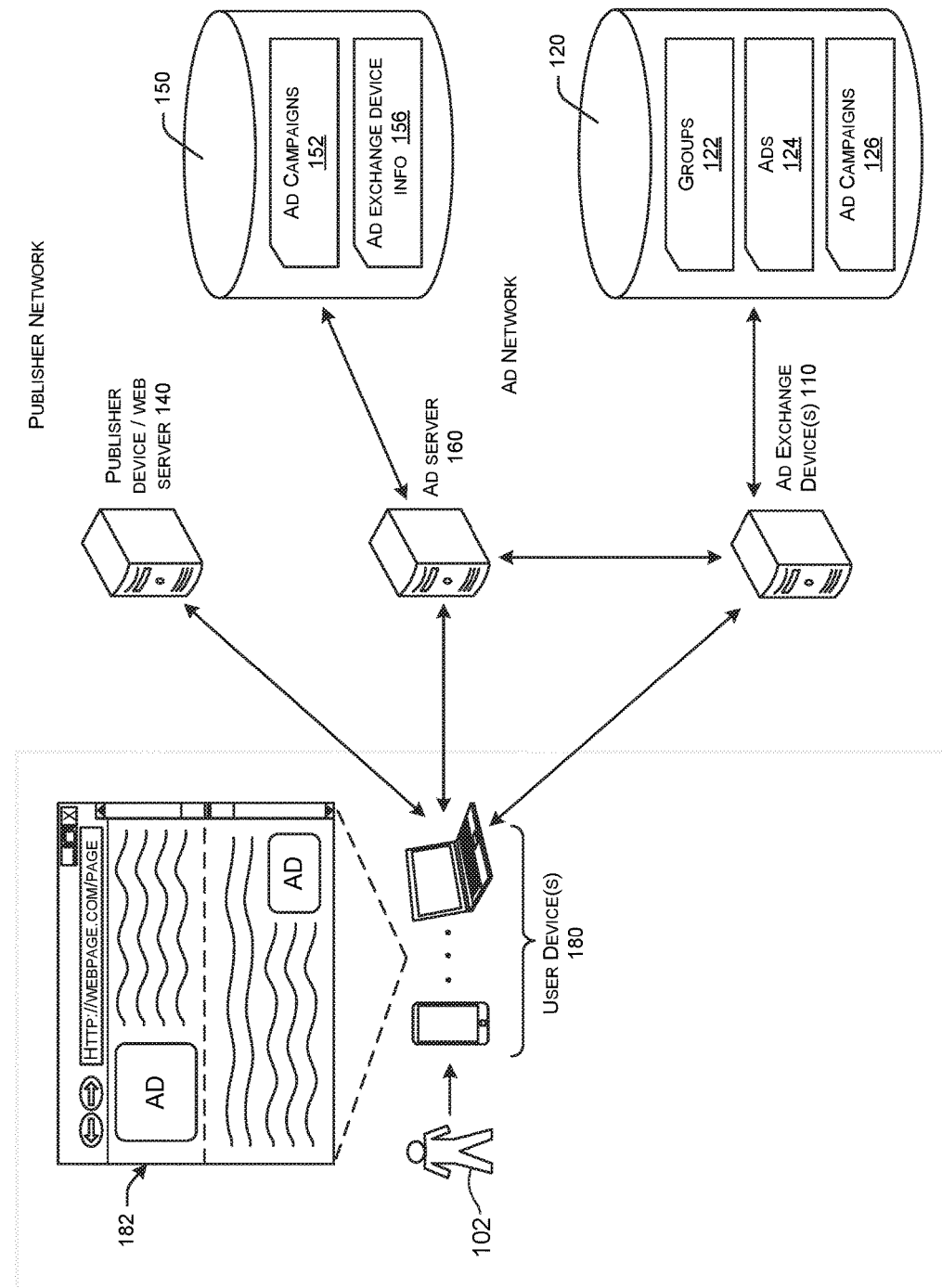
FIGS. 1A-1D illustrate example schematic diagrams of network configurations that may be used to implement targeted purchases of ad space, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments herein are directed to, among other things, targeted ad buys. As used herein, targeted ad buys may refer to the process of selectively identifying or targeting ad space on web pages for purchase. The purchased ad space may be used to display one or more ads for an advertiser's products or services. Whether ad space on a web page is targeted may be based on information associated with the web page, such as a user and/or a user device that is accessing the web page. Certain embodiments herein relate to leveraging relationships between an advertiser and a publisher of web page content, or other information, to facilitate selective or targeted purchases of ad space.

According to one example, an advertiser and a publisher may establish certain parameters that may define how one or more ads may be displayed on a web page. Such parameters may include the type of content on the web page, the location on the web page at which an ad may be displayed, the price an advertiser is willing to pay to display an ad on the web page, or other attributes that may define the conditions according to which an ad is presented on a web page. Such attributes may be characterized as ad campaigns, as used herein.

In one embodiment, a computing device associated with an advertiser may be configured to communicate with one or more computing devices associated with a publisher to activate one or more established ad campaigns. In certain embodiments herein, activating an ad campaign may include submitting a bid for an opportunity to display one or more ads in accordance with the ad campaign. Activation of an ad campaign may be dynamic in the way that an advertiser may activate certain ad campaigns based on information received in real-time about a user or a user device, such as may be associated with a communication session (e.g., a cookie, browse history, etc.) of the user device accessing the web page, as well as information received about a publisher and/or web page content, as non-limiting examples. Such information may be stored into groups or categories such that similar users may be associated with one another. For example, users who visited more than a certain number of web pages over the previous seven days may be grouped together. One or more ad campaigns may be associated with a group such that when a user associated with a group is identified, an ad campaign associated with the group may be activated (e.g., turned on for the purpose of bidding for the ad space), and if the ad campaign bid is selected, then an ad associated with the ad campaign may be presented on the web page.

Certain embodiments herein also relate to activating ad campaigns according to a schedule. Such a schedule may include, but is not limited to, information identifying a user, one or more ad campaigns and ads targeted for the user, and web page content in which the ad may be presented according to an ad campaign. In one embodiment, the schedule may be stored at various devices, such as a user device, an ad server device that may be configured to activate and select ad campaigns, or a server device that may act as an intermediary for distributing web page content from a publisher device to the user device. When such devices determine that information in the schedule matches information associated with a user's request for web page content, such as a particular web page requested by the user (e.g., based on a Uniform Resource Locator (URL)) and/or an identification of the user (e.g., cookie identification), the devices may identify an ad campaign in the schedule associated with the web page and/or the user and cause activation of the ad campaign in a bid for ad space. In this way, a schedule herein may be referred to as a schedule of future interest in the way that after a schedule is established for targeting certain ad campaigns and ads for certain users, the ads may be displayed for the user according to an ad campaign when the user makes future requests for web page content.

Examples of targeted ad buys as described herein may be as follows. A first example may be related to activating ad campaigns via a web browser at a user device to target an ad buy or purchase. According to this example, in association with a user device accessing a publisher web page (e.g. the business news web page), the user device may be redirected to a device associated with an advertiser ("ad device"). The ad device may receive and analyze information associated with the user device, a user, a publisher device providing the business news web page, etc., (generally referred to as "user information"), to determine an ad campaign for displaying on the web page presented to the user. The determination of the ad campaign may be based at least in part on a group to which at least a portion of the user information (e.g., the user device as may be identified by a cookie) belongs. For example, user devices that have accessed business news web pages ten times or more within the last thirty days may be grouped together. An ad campaign (e.g., campaign ABC) for presenting an ad at the most prominent location on the web page may be assigned to such a group, in one embodiment, based on the relatively high level of interest in business products and services demonstrated by user devices in the group. Because there may be a high likelihood that user devices in the group may be associated with a purchase of business products or services, an advertiser may establish a relatively high bid price of $7, for example, for the opportunity to present an ad to such user devices. Thus, one or more ad campaigns identified for the group, as well as one or more ads, may be determined.

In response to identifying one or more ad campaigns and ads for a user, the ad device may send various information to the user device to facilitate the targeting of ad buys. Such information may include ad data, which may include Hypertext Markup Language (HTML) or other code associated with a determined ad for display on the business news web page. When executed by a browser at the user device, the ad data may present the determined ad for display at the user device. As will be described in greater detail below, a code that may be established between an advertiser and a publisher may be sent from an ad server device and may be used to render the ad at the user device.

The information sent from the ad device to the user device may also include a command or string that, when executed by the web browser at the user device, may signal to the ad server (which may store ad campaigns) that the ad device desires to purchase ad space on the business news web page. In one embodiment, such a command may include a source code name and one or more source code parameters that may identify one or more ad campaigns that the ad device requests the ad server to activate or to effectively submit in a bid for ad space. In certain aspects of this embodiment, the source code parameter may include an ad campaign identifier as a source code parameter, various attributes of an ad campaign that may indicate a particular ad campaign (e.g., location of the ad campaign, price of the ad campaign, size of the ad space associated with the ad campaign, etc.), or other information that may be used to identify an ad campaign by the ad server.

As an example, an ad device may identify ad campaign "ABC" for a user who accessed the business news web page. In one embodiment, the ad device may embed a string or command, along with a parameter ABC to the command, in HTML that may be sent to the user device. The command, when executed by a web browser at the user device, may be sent from the user device to the ad server. The ad server may execute the command after receipt of the command, which may execute the command, which may in turn cause the activation the ABC ad campaign. In this way, the ABC ad campaign may be considered among multiple other ad campaigns or ad bids in an auction to determine which ad campaigns or ad may be used in presenting an ad on the business news web page.

If ad campaign ABC is selected by the ad server, the ad server may, in one embodiment, send a code to the user device that may enable the user device to render an ad on the business news web page. According to this embodiment, the ad rendered at the user device may have been predetermined by the ad device and sent as ad data (e.g., HTML for the ad), as described above. In another embodiment, upon ad campaign ABC being selected, the ad server may send a request (e.g., to the ad device) for an ad that may be displayed on the business news web page. The ad device may determine one or more ads in response to the request and send the one or more ads to the user display for display on the business news web page according to the ad campaign. Displaying an ad according to an ad campaign may mean that the ad is of a certain size, type (e.g., banner), etc., that is consistent with the ad campaign.

Other examples of targeted ad buys may be related to activating ad campaigns according to a schedule that may be stored at various devices, as described above. According to one example, a schedule of future interest may be stored at a web server intermediary, such as a device that may act as an intermediary delivering web page content from a publisher to a user device. If a user (e.g., cookie identifier), and a web page requested by the user in some embodiments, is identified in the schedule as an opportunity of interest to an ad device for presenting an ad, then the web server intermediary may identify an ad campaign (and an ad in some embodiments) in the schedule associated with the user, and send a command that may include the ad campaign to the ad server, which may execute the command to activate or submit the ad campaign as a bid in an auction. The identified ad may be rendered at the user device upon the web server intermediary, or the user device, receiving a code from the ad server that may be used to render the ad.

In other examples, the schedule of future interest may be stored at the user device or the ad server. Similar to that described above, the ad server or the user device may identify an ad campaign in the schedule based on a user identification (e.g., a cookie) and web page content requested by the user. The ad server may activate the ad campaign after identifying it, in one embodiment. In an embodiment in which the schedule is stored at the user device, the user device may send a command to the ad server that may cause the ad campaign to be activated by the ad server. According to these examples, object-oriented program code, such as a container, may be used to provide the determinations, identifications, and/or activations described above.

Certain embodiments herein also relate to updating information associated with ad campaigns. For example, in response to not being selected to display ads on the business news web page, the ad device may update the bid price or other information to increase the likelihood that the ad campaign ABC will be selected.

The above examples are not meant to be limiting. Numerous other examples involving different types of web page content, types and numbers of ad campaigns, information used to determine an ad campaign, numbers of source code parameters, devices that may store and utilize a schedule to determine ad campaigns and ads, etc., may also exist, some of which are described in greater detail below.

FIG. 1A depicts an example schematic diagram of a network configuration that may be used to implement targeted purchases of ad space, as described herein. The embodiment in FIG. 1A may be directed to targeted purchases of ad space in which a user device 180 mediates communication between an ad exchange device 110 and an ad server 160 to activate one or more ad campaigns. The network configuration in FIG. 1A may include an ad network, a publisher network, and various user devices 180 that may communicate with devices in the ad network and the publisher network, such as the ad exchange device 110, the publisher device 140, and the ad server 160. Devices in the publisher network may be configured to disseminate content via web pages or other information resources to the user devices 180, among other functions. Devices in the ad network may be configured to distribute one or more ads for presentation on publisher web pages, among other functions.

The ad exchange device 110 may be associated with an advertiser or other entity that desires to advertise products or services to potential customers, such as users viewing ads associated with such products or services on a web page. According to the embodiment in FIG. 1A, the ad exchange device 110 may facilitate targeted purchases of ad space at least in part by communicating with the ad server 160 to establish one or more ad campaigns, analyzing information in the data store 120 to determine one or more ad campaigns to activate, and generating a command that, when executed, may cause the activation of the one or more ad campaigns by the ad server 160.

The information in the data store 120 may include, but is not limited to, categories or groups 122 associated with user information, ads 124, and ad campaigns 126. The groups 122 may include categorizations of user information and associated ad or ad product type or category. Such user information may be identified by a cookie associated with a user device 180 that accesses the ad exchange device 110, for example, as part of a redirection from the publisher device 140 to facilitate identification of the user device 180 by the ad exchange device 110, and to request an ad for display on a web page. The user information may include information about a user's communication sessions, for example, a user device's historical activities, such as web pages visited by the user, buttons on web pages selected by the user, whether the user logged into a web page or other information resource, such as social media consumed key words associated with social media post, update, search terms, etc. As an example, users who visited similar web pages, purchased similar items, specified the same or closely located zip codes, etc., may be associated with one another. The user information may also include keywords or other descriptions of web page content visited by the user, the URL of web pages containing such content, information that may identify the publisher or provider of the web page content, etc.

Information in the groups 122 may also be distinguished based on information associated with a user utilizing the user device 280, such as the user's demographic information (e.g., the user's name, age, sex, race, home and/or business address, etc.), the user's activities associated with viewing web page content associated with the publisher device 140, among other information. Users who share the same zip code, for example, may be placed in the same group.

Information in the groups 122 may be further distinguished based on personal information, such as preferences for certain products or services, that may be received in response to a survey or other information requests. Users who prefer the same or similar products, for example, may be placed in the same group. Cookie information in the groups 122 may include session identification or other information that an ad exchange device 110 may recognize and may use to retrieve additional information about a user, such as purchase history, browse history, profile information, search terms, etc. Numerous other examples may exist in other embodiments.

As mentioned above, the ad exchange device 110 may also communicate with the database 120 to access one or more ads 124. The ads 124 may advertise products or services associated with an advertiser, such as an advertiser directly associated with the ad exchange device 110, a third party advertiser on behalf of which the ad exchange device 110 may submit bids for displaying third party ads. As will be described in greater detail below, an ad 124 may be associated with one or more groups.

Various ad campaigns 126 also may be stored in the database 120. As used herein, an ad campaign may refer to one or more characteristics or attributes of an ad that is displayed to a user. Such attributes may include the size of an ad, the price of the ad, the location of the ad on a web page (e.g., above the fold or below the fold), whether the space in which the ad may be presented is dedicated to a particular advertiser (e.g., the ad exchange device 110), and various other attributes. An ad campaign may include one or more of such attributes, and a bid price commensurate with such attributes based on an advertiser's value assessment of presenting an ad according to the attributes. For example, an advertiser may submit a higher bid price for an ad that will be displayed above the fold as compared to an ad that will be displayed below the fold.

Figure 2:
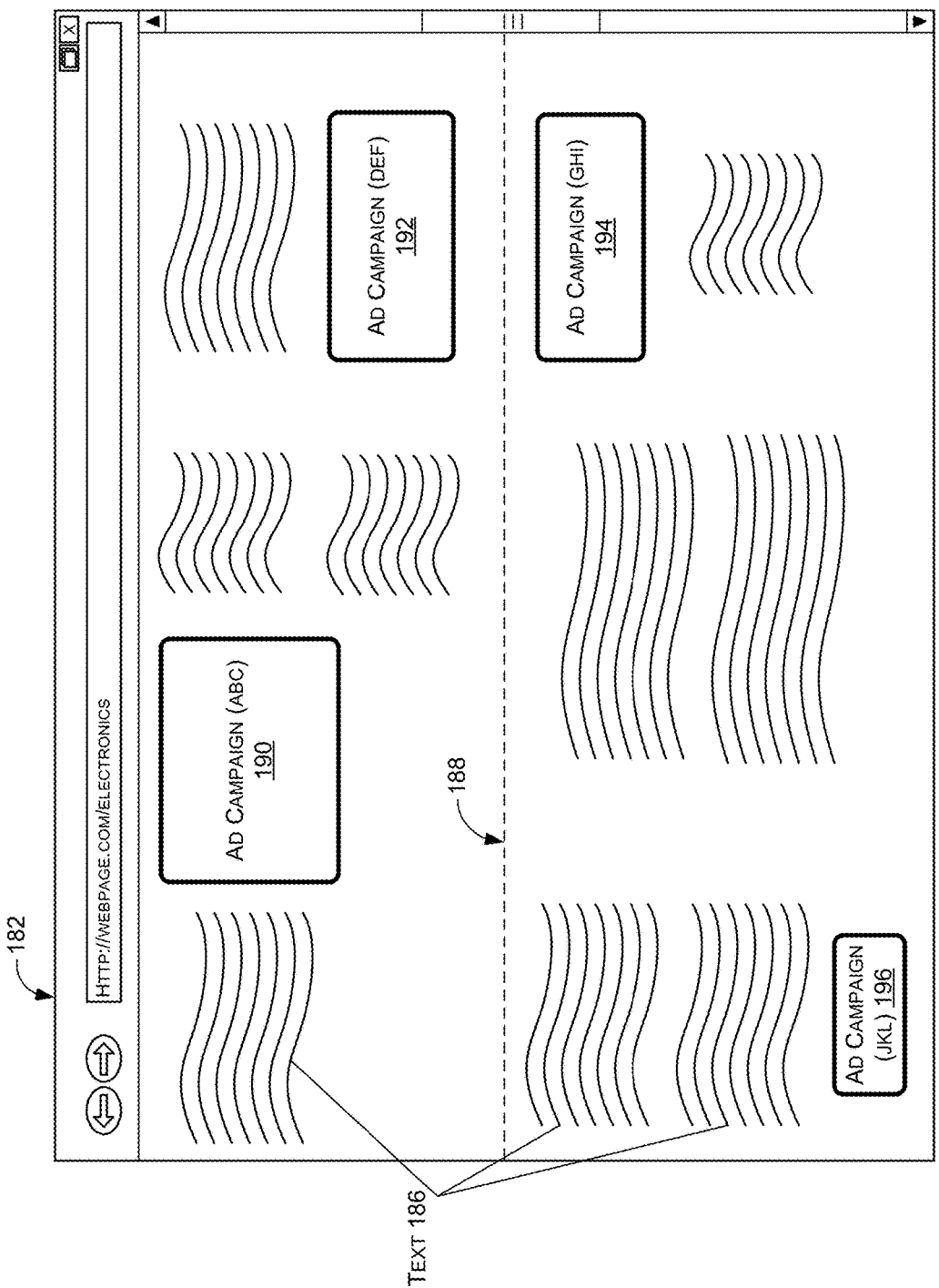
FIG. 2 illustrates example web page content including a representation of various ad campaigns, according to an embodiment of the disclosure.

FIG. 2 depicts example representations of how ad campaigns may correspond to ad space on a web page displayed on the user device 180, according to an embodiment of the disclosure. In certain embodiments herein, a relationship may exist between an ad campaign, an ad, and ad space in which an ad in shown. According to one example, one or more ads may be associated with an ad campaign. Such an association may include displaying the ads according to an ad campaign, or based on attributes associated with the ad campaign, such as location, size, etc. Thus, an ad associated with an ad campaign may be located on a web page at the same or similar location as defined in the ad campaign, and may have the same size as defined in the ad campaign, among other attributes. The ad may be presented to a user in ad space on a web page rendered at a user device 180. As used herein, "ad space" may refer generally to a location, an environment, or a placeholder that may store and/or serve ads. In one example, ad space may refer to a particular location on a web page in which an ad may be presented for viewing and/or interaction by a user.

As shown in FIG. 2, a web page 182 (a portion of which is illustrated as web page 182 in FIG. 1A) may include, among other information, text 186 associated with various content (e.g., information about electronics products and services), images, and representations of ad campaigns 190, 192, 194, and 196. The rectangles representing the ad campaigns may indicate the location, size, etc., of an ad associated with the ad campaigns on the web page 182. For example, the ad campaign 190 may be associated with displaying an ad in the "buy box," or the most prominent location on the web page 182, which may be ad campaign 190 for purposes of illustration. Because the ad campaign 190 may be associated with the most prominent location on the web page 182, an advertiser associated with the ad exchange device 110, for example, may be willing to submit a relatively higher price for an opportunity to display an ad according to the ad campaign 190.

An additional ad campaign (e.g., ad campaign 192) may be located above the fold like the ad campaign 190 but may have other attributes that differ. For example, the ad campaign 192 may present ads that have a smaller size than ads presented in association with the ad campaign 190. Different bid prices may be associated with the ad campaigns 190 and 192 based on an advertiser's value assessment of displaying ads according to the attributes associated with these ad campaigns.

Representations of ad campaigns 194 and 196 may be located below the fold 188, as shown in FIG. 2. Ads associated with such campaigns may also have attributes that are different from ads associated with ad campaigns above the fold, as well as each other. As an example, ad campaign 194 may be reserved for the ad exchange device 110, unlike the ad campaign 196, which is also below the fold but may not be reserved for the ad exchange device 110 and may be smaller in size than the ad campaign 194. A bid price may be established for each of these ad campaigns as described above.

In some embodiments, an ad campaign may have multiple prices. For example, the ad campaign 188 may have a bid price of $7 or $5, which may vary according to an ad exchange device's 110 desire to display an ad to a particular user. In one embodiment, a different ad campaign identification code may be assigned for each price variation for an ad campaign. Thus, ad campaigns that have the same attributes except for bid price may have a different identification code distinguishing them, in one embodiment.

Ad campaigns may each have unique identification codes that may distinguish them from other ads campaigns. For example, as shown in FIG. 2, unique identification codes ABC, DEF, GHI, and JKL may be associated with ad campaigns 190, 192, 194, and 196, respectively. As will be described in greater detail below, the ad exchange device 110 may cause activation of ad campaigns by specifying such unique identification codes, in one embodiment. In other embodiments, the ad exchange device 110 may cause activation of ad campaigns by specifying attributes corresponding to an ad campaign or other information that may uniquely identify the ad campaign, such as the location of the ad campaign, the bid price of the ad campaign, the size of the ad space associated with the ad campaign, information identifying the ad exchange device or associated advertiser, etc.

The above configuration in FIG. 2 is not meant to be limiting. Different numbers and locations of ad campaigns, attributes associated with ad campaigns, etc., may exist in other examples. As another example, the identification codes associated with the ad campaigns may include various unique characters, strings, etc., such as numeric, alphanumeric, characters, etc., of varying length.

Returning to FIG. 1A, a user 102 utilizing the user device 180 may influence which one or more ad campaigns may be selected by the ad exchange device 110 for activation. For example, the ad exchange device 110 may select ad campaign 190 for a user 102 who is identified as having a relatively high likelihood of purchasing a product or service associated with an ad, whereas ad campaign 196, or a less desirable ad campaign in one example, may be selected for a user 102 who is identified as having a relatively low likelihood of purchasing a product or service associated with an ad. Numerous other examples may exist, at least some of which will be described in greater detail below.

Returning to the contents of the database 120, the ad campaigns 126 may be comprised of descriptions of the attributes described above. An example description of ad campaign 190 may include: "id=ABC," "location: buy box," "size: 300×250," "ad type: banner," "price: $7." The database 120 may store such information in a format that may facilitate parsing of the information by software applications and/or modules to identify a field (e.g., "location") and a value (e.g., "buy box"). As will be described in greater detail below, the ad server 160 may parse such information from a message received from the ad exchange device 110 to establish ad campaigns associated with the ad exchange device 110 in the publisher network.

As shown in FIG. 1A, the ad exchange device 110 may communicate with devices in the publisher network, such as the ad server 160. Such communication may include establishing ad campaigns that may be activated by an ad server 160 to submit a bid on behalf of the ad exchange device 110 for ad space.

The ad exchange device 110 may also communicate with one or more user devices 180, such as a laptop computer, tablet, smart phone, etc. In one embodiment, the ad exchange device 110 may send program code or commands to the user device 110 that may cause the user device 110 to communicate with the ad server 160, which may activate one or more ad campaigns indicated in one or more parameters associated with the program code. An example of such processes will be described in greater detail below.

The ad server 160 may access information in a data store 150 in the publisher network. For example, the ad server 160 may access the ad campaigns 152 to identify available ad campaigns. Ad campaigns associated with various advertisers may exist. In one embodiment, the ad campaigns may be stored in a format similar to that described for the ad campaigns 126 in database 120. The ad server may also access ad exchange device information 156, which may include details associated with accessing the ad exchange device 110, or other ad devices. In one embodiment, the ad exchange device information 156 may include a Uniform Resource Locator (URL) associated with the ad exchange device 110, or a URL associated with a device that may store one or more ads for presentation on a web page. The ad exchange device information 156 may also include one or more codes (e.g., access codes) that may enable the rendering of an ad on a web page. Such codes may be established during the establishment of ad campaigns. As will be described in greater detail below, the ad server 160 may select an ad campaign based on various criteria and cause the display of an ad associated with the ad exchange device 110 on a web page, among other functions.

The publisher device 140 may provide web page content to user devices 180 or other devices, such as a web server intermediary device, as will be described in greater detail below. In providing or serving web page content, the publisher device may embed a command or message in HTML, or other code for rendering web page content, that instructs the user device 180 to contact a particular device, such as the ad exchange device 110. Such a command may be excluded in all web pages served by the publisher device 140 or, in some embodiments, at least a portion of such web pages based on any number of criteria, such as an agreed number of web pages, the web page content, information associated with the user who requested the web page content, etc.

In an example embodiment, the devices shown in FIG. 1A may communicate with each other to implement targeted purchases of ad space, as referred to herein. A relationship between the ad exchange device 110 and the publisher device 140 may be leveraged to facilitate targeted purchases of ad space, in certain embodiments. For example, the ad exchange device 110 may establish one or more ad campaigns with the ad server 160. Establishing an ad campaign may mean that the ad server 160 may recognize ad campaigns created by the ad exchange device 110 such that when the ad exchange device 110 provides a reference to an ad campaign, for example, the ad server 160 may identify the ad campaign, submit it in an auction or other process to determine a winning ad campaign, and select the ad campaign for displaying one or more ads on a web page or other information resource according to the ad campaign.

In conjunction with establishing an ad campaign, the publisher device 140 may insert a command, program code, or otherwise an instruction in a web page that may be called or invoked at a user device 180. The command may instruct the user device 180 to call (e.g., access) the ad exchange device 110, which may present an opportunity for the ad exchange device 110 to collect information associated with the user device 180 and/or a user utilizing the user device 180. For example, the command may access and send to the ad exchange device 110 various information associated with the user, such as a cookie identifier, a URL associated with web page content requested by the user, information identifying the publisher device 140, etc. The user information may also include information associated with the cookie, such as a user's browse history, search history, session history, purchase history, etc. Further, in some embodiments, the command may access information associated with ad space on a web page, such as location of the ad space (e.g., "homepage-top," above the fold, etc.), the size of the ad space, etc., and send it to the ad exchange device 110.

The ad exchange device 110 may use such information to determine one or more ad campaigns. In an embodiment in which information associated with ad space on a web page is provided, the ad exchange device 110 may identify an ad campaign based at least in part on the parameters associated with the ad space, such as the location and size of the ad space.

The ad exchange device 110 may also insert program code or a command into a web page that may be called or invoked at the user device 180. For example, after the ad exchange device 110 has identified one or more ad campaigns, the ad exchange device 110 may insert program code or a command into the web page that instructs the user device 180 to call the ad server 160. In certain embodiments herein, the program code may be a function that may be called by the ad server 160 to activate or turn on one or more ad campaigns indicated or referenced in one or more parameters associated with the program code or command. In this way, requests to activate or turn on certain ad campaigns associated with the ad exchange device 110 may be injected into the ad server 160, which may be granted by the ad server 160 submitting an offer or bid on behalf of the ad exchange device 110.

The ad server 160 may also insert program code or a command into a web page that may be called or invoked at the user device 180 to facilitate targeted purchases of ad space. For example, in association with the ad exchange device 110 winning a bid for ad space, the ad server 160 may insert program code that may instruct the user device 180 to send a request to the ad exchange device 110 to request an ad for displaying in the ad space. In other embodiments, the ad exchange device 110 may receive information associated with an ad selected by the ad exchange device 110 and may utilize such information to access the selected ad. According to these embodiments, the ad server 160 may send a code to the ad to the user device 180 that may enable the user device 180 to render an ad (e.g., an ad determined by the ad exchange device 110 and provided to the user device 180).

The above descriptions in FIG. 1A and FIG. 2 are not meant to be limiting. Numerous other examples, configurations, etc., may exist in other embodiments. For example, various other types of communication between devices may exist in other embodiments. For example, the ad exchange device 110 may communicate directly with the ad server 160 to activate one or more ad campaigns in some embodiments. Also, the processes described above may be performed by fewer or more devices. For example, the processes performed by the ad server 160 may also be performed by the publisher device 140.

Figure 1B:
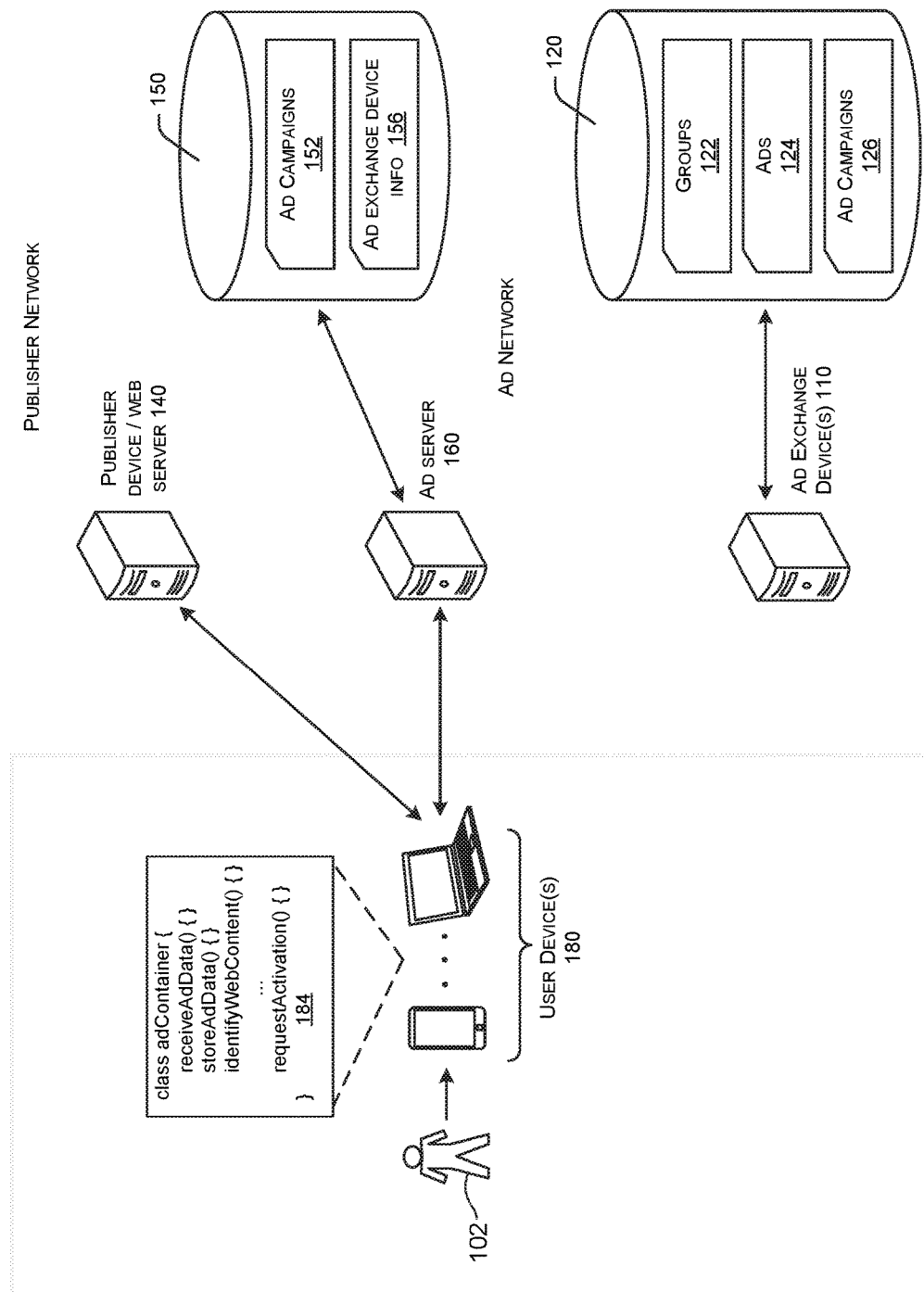

FIG. 1B depicts an example of targeted ads buys according to a schedule, which may include one or more predetermined ad campaigns and ads for presentation to a user at a user device 180. Such a schedule may be stored in a database, file, array, list, etc., that may relate a user identification with ad campaigns, ads, publisher information, web page content information such as a URL, time of day for presenting ads in the schedule, and various other criteria that may control or facilitate the selection of ad campaigns and ads for presentation to a user. In one embodiment, the ad campaigns, ads, and user information may be determined by the ad exchange device 110 and stored in a schedule at the user device 180, in association with the processes described in FIG. 1A. When the conditions in the schedule are met, such as when a particular user in the schedule requests web page content, the one or more ad campaigns predetermined for the user, as may be identified in the schedule, may be selected and sent in a command that, when executed by the ad server 160, may activate the one or more ad campaigns or effectively submit the one or more ad campaigns in a bid for ad space.

In the embodiment shown in FIG. 1A, the user device 180 may store the schedule and may cause activation of one or more ad campaigns. In one embodiment, the user device may include one or more containers, or program code that may facilitate storing information the schedule, identifying ad campaigns and ads in the schedule based on various criteria (such as web page content, and the user who requested the web page content), requesting activation of the one or more identified ad campaigns, and rendering one or more ads associated with the one or more respective ad campaigns in association with winning a bid for ad space, among other functions. The container 184 stored at the user device 180 may provide such functionality, in one embodiment.

The container 184 may include the example program code or functions shown in the adContainer class in FIG. 1B, among other functions. For example, a receiveAdData or other function may receive ad data, such as information identifying a user of the user device (e.g., a cookie identifier), HTML or other code for an ad that may be displayed on a web page for the user, ad campaigns according to which the ad may be presented to the user, publisher information, criteria or conditions that may facilitate the selection of ad campaigns and ads, etc. The container 184 may further include a storeAdData or other function may store the ad data at the user device 180. As described, the ad data may be stored such that when future opportunities to display an ad for a user arises, the user device 180 may identify such opportunities and cause activations of ad campaigns to submit a bid for an opportunity to display an ad for a user.

The identifyWebContent or other function may identify the opportunities for presenting ads to users based on the information in the schedule. For example, when a particular user requests web page content, the identifyWebContent function may determine an ad campaign in the schedule associated with the user. Such functionality may be consistent with an advertiser's desire to display an ad, according to an ad campaign, for a particular user if the user is browsing web page content. In some embodiments, an ad may be presented to the user based on the user requesting certain web page content. For example, the schedule may indicate that an ad should only be shown to the user when the user requests content associated with a certain web page URL, certain web page content, etc.

The requestActivation or other function may request activation of an ad campaign by the ad server 160, in one embodiment. The request may include sending a command from the user device 180 that, when executed by the ad server 160, may activate the ad campaign as stored in the database 150 or submit the ad campaign as a bid in an auction for ad space on a web page.

As described in FIG. 1A, the embodiment in FIG. 1B may also include a publisher device 140 (e.g., a web server), which may serve web pages to the user device 180, and an ad exchange device 110 that may perform the same or similar functions to the ad exchange device 110 in FIG. 1A. In FIG. 1B, the ad exchange device 110 may no longer communicate with the user device 180 to cause activation of ad campaigns, as indicated by the absence of an arrow between the ad exchange device 110 and the user device 180. Such a connection may no longer be required when a schedule is maintained and utilized by the container 184 at the user device 180, as described above.

The groups 122, ads 124, and ad campaigns 126 in the database 120 shown in FIG. 1B may be the same or similar to the groups 122, ads 124, and ad campaigns 126 described in FIG. 1A. Further, the ad campaigns 152 and the ad exchange device information 156 in the database 150 in FIG. 1B may be the same or similar to the ad campaigns 152 and ad exchange device information 156 in FIG. 1A.

Figure 1C:
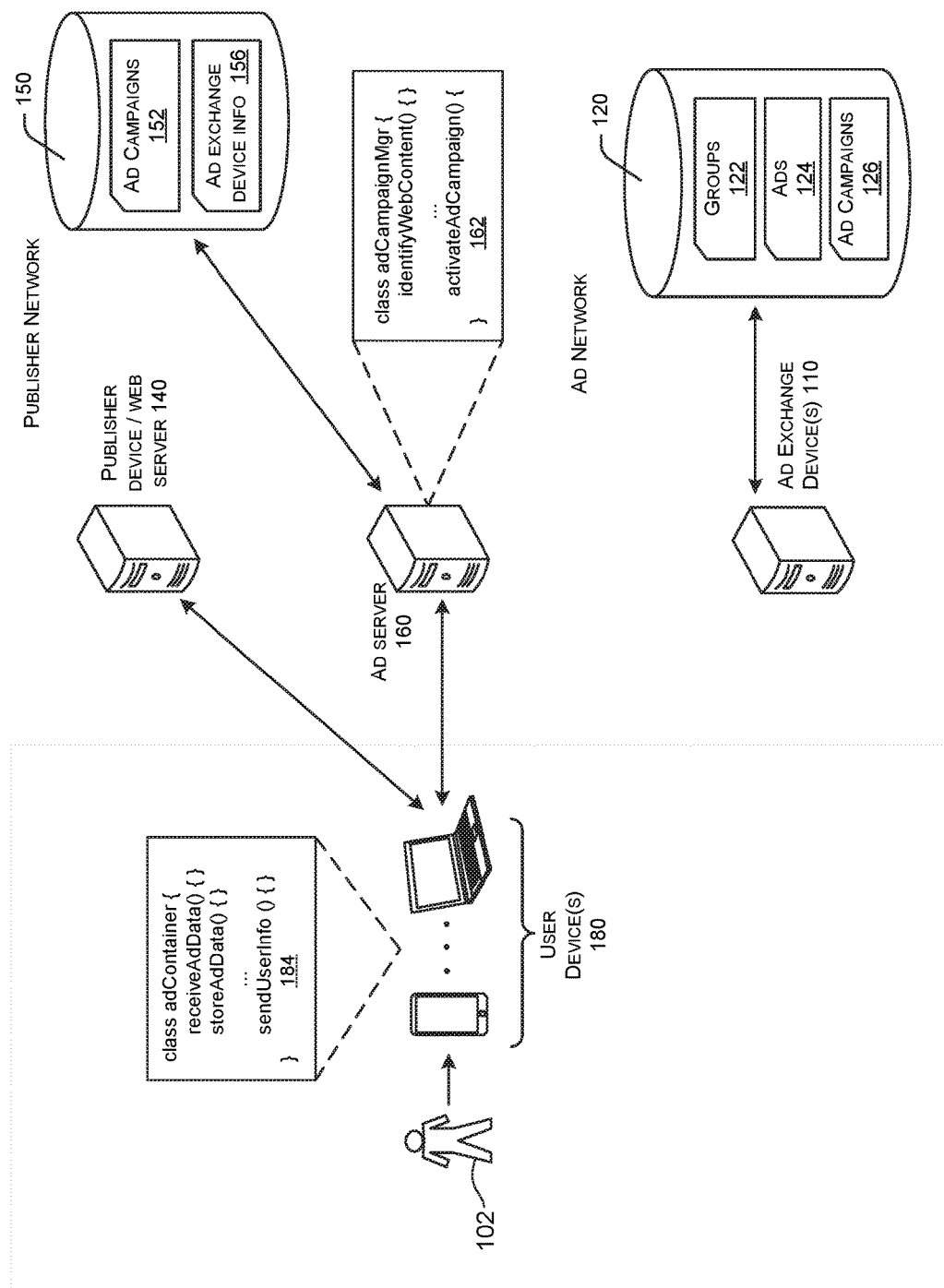

FIG. 1C also depicts an example of targeted ad buys according to a schedule, in one embodiment of the disclosure. Such a schedule may also be located at the ad server 160 and may be utilized by a container 162 (e.g., object-oriented code or program code). In one embodiment, the schedule accessed by the container 184 may be the same as the schedule described in FIG. 1A.

In the embodiment in FIG. 1C, activation of ad campaigns may be facilitated by program code or container 184 at the user device 180 and the container 162 at the ad server 160. According to one example, the program code 184 may receive ad data (e.g., information identifying a user of the user device (e.g., a cookie identifier), HTML or other code for an ad that may be displayed on a web page for the user, ad campaigns according to which the ad may be presented to the user, publisher information, and criteria or conditions that may facilitate the selection of ad campaigns and ads) via the receiveAdData or other function. The storeAdData function or other function may store the ad data. In one embodiment, both the receiveAdData and storeAdData functions may operate in the same or similar manner as that described in FIG. 1A. In addition, the sendUserInfo or other function may send user information to the ad server 160, which may utilize the user information to identify an ad campaign in a schedule for activation. Such user information may include, but is not limited to, a user identification (e.g., a cookie identifier associated with the user device 180), and a URL or other information associated with a web page requested by the user device 180.

Upon identifying an ad campaign in the schedule based on such information, the ad server 160 may activate the ad campaign or effectively submit the ad campaign in an auction on behalf of the ad exchange device 110, which may have provided the information in the schedule to the ad server 160, for example, as part of the processes performed in FIG. 1A. If the ad campaign submitted on behalf of the ad exchange device 110 wins the auction, then the ad server 160 may send a code to the user device 180 that may enable the user device 180 to render an ad for display on the requested web page. Such an ad may be stored in ad data received at the user device 180, for example, via the receiveAdData function as described above, in one embodiment.

As described in FIG. 1A, the embodiment in FIG. 1C may also include a publisher device 140 (e.g., a web server), which may serve web pages to the user device 180, and an ad exchange device 110 that may perform the same or similar functions to the ad exchange device 110 in FIG. 1A. In FIG. 1C, the ad exchange device 110 may no longer communicate with the user device 180 to cause activation of ad campaigns, as indicated by the absence of an arrow between the ad exchange device 110 and the user device 180. Such a connection may no longer be required when a schedule is maintained and utilized by the container 162 at the ad server 160 in conjunction with program code 184 at the user device 180, as described above.

The groups 122, ads 124, and ad campaigns 126 in the database 120 shown in FIG. 1C may be the same or similar to the groups 122, ads 124, and ad campaigns 126 described in FIG. 1A. Further, the ad campaigns 152 and the ad exchange device information 156 in the database 150 in FIG. 1C may be the same or similar to the ad campaigns 152 and ad exchange device information 156 in FIG. 1A.

Figure 1D:
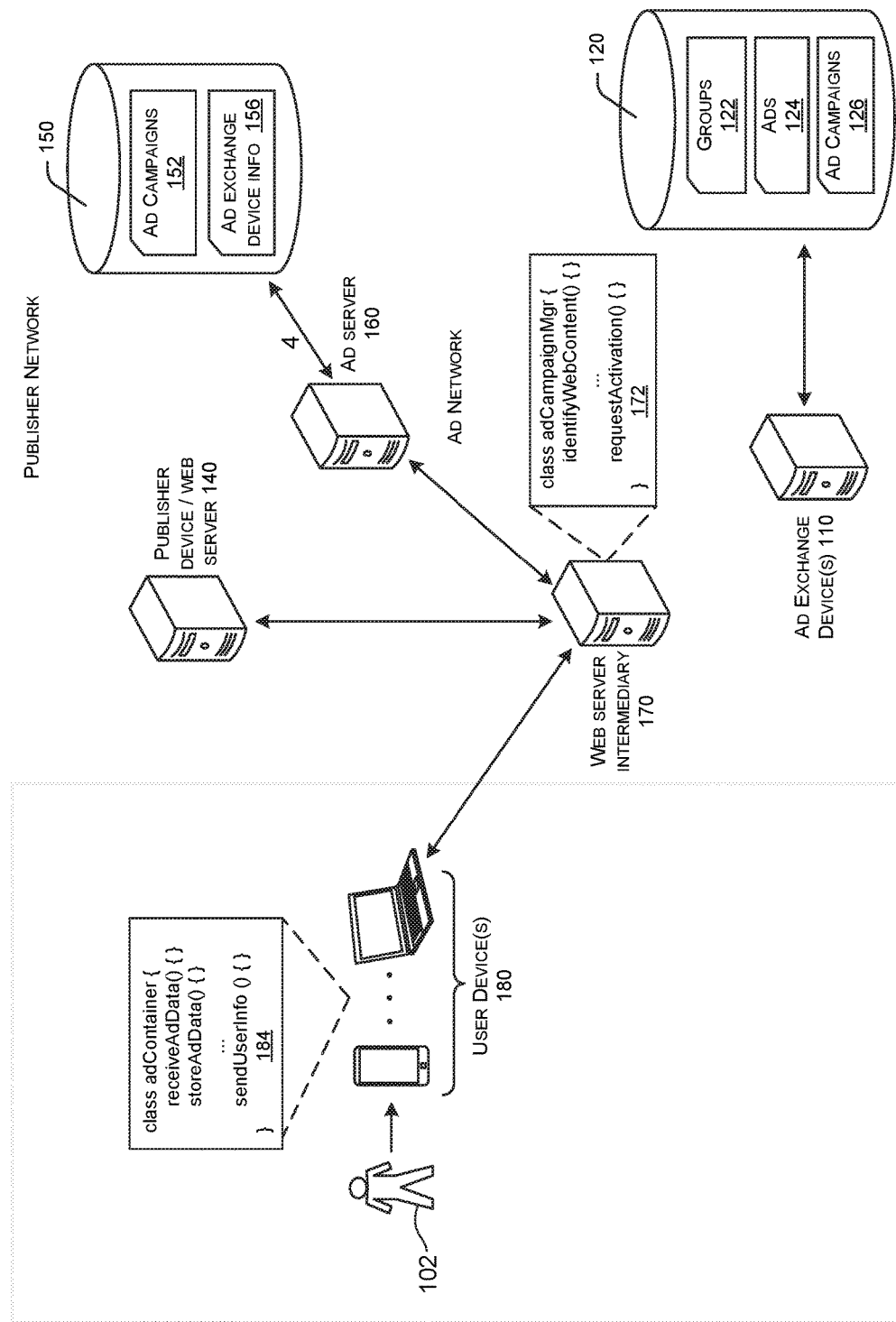

FIG. 1D also depicts an example of targeted ad buys according to a schedule, in one embodiment of the disclosure. Such a schedule may also be located at the web server intermediary 170 and may be utilized by a container 172 (e.g., object-oriented code or program code). In one embodiment, the schedule accessed by the container 172 may be the same as the schedule described in FIG. 1A.

As used herein, a web server intermediary may refer to a device that interfaces between a device that serves web page content (e.g., the publisher device 140) and the user device 180 to forward requests for web page content received from the user device 180 to the publisher device 140, and provide web page content from the publisher device 140 to the user device 180. The web server intermediary 170 may perform a number of functions in conjunction with distributing requests for content and content between the user device 180 and the publisher device 140. For example, the web server intermediary may optimize the distribution of content to the user device 180 at least in part by predicting web page content that may be requested by the user device 180. Such content may be cached or otherwise stored at the web server intermediary 170 such that when the user device 180 requests the content, the web server intermediary may not be required to request such content from the publisher device 140. Numerous other functionality may be provided by the web server intermediary in other examples.

The web server intermediary 170 may cause activation of ad campaigns via the container 172 working in conjunction with the container or program code 184 at the user device 180, according to one embodiment. For example, as described above, the receiveAdData or other function may receive ad data (e.g., information identifying a user of the user device (e.g., a cookie identifier), HTML or other code for an ad that may be displayed on a web page for the user, ad campaigns according to which the ad may be presented to the user, publisher information, criteria or conditions that may facilitate the selection of ad campaigns and ads, etc.). Further, the ad data may be stored by the storeAdData function or other function. Additionally, the sendUserInfo function or other function may send user information, such as the stored ad data, to the web server intermediary 170, where it may be analyzed to determine one or more ad campaigns in the schedule associated with at least a portion of the user information. In one embodiment, such analysis may be performed by the identifyWebContent function or other function.

After one or more ad campaigns are identified, the requestActivation function or other function may send a command or request to the ad server 160 to activate the one or more ad campaigns, which may be stored in the database 150. If at least one of the one or more ad campaigns wins an auction for ad space (e.g., the ad exchange device 110 wins the auction), the ad server 160 may send a code that may allow the user device 180 to render one or more ads in the web page content requested by the user device 180. In one embodiment, such a code may be received by the web server intermediary 170 and used to render the one or more ads in the web page content in association with providing the web page content to the user device 180. In other embodiments, in association with the ad exchange device 110 winning an auction, the ad server 160 may send a request for an ad to the web server intermediary 170, the user device 180, or another device that may store the ad. Such devices may cause presentation of the ad at the user device 180.

The publisher device 140 and the ad exchange device 110 in FIG. 1D may perform the same or similar functions as performed by such devices in FIG. 1A. In FIG. 1D, the ad exchange device 110 may no longer communicate with the user device 180 to cause activation of ad campaigns, as indicated by the absence of an arrow between the ad exchange device 110 and the user device 180. Such a connection may no longer be required when a schedule is maintained and utilized by the container 184 at the user device 180, as described above.

The groups 122, ads 124, and ad campaigns 126 in the database 120 shown in FIG. 1D may be the same or similar to the groups 122, ads 124, and ad campaigns 126 described in FIG. 1A. Further, the ad campaigns 152 and the ad exchange device information 156 in the database 150 in FIG. 1D may be the same or similar to the ad campaigns 152 and ad exchange device information 156 in FIG. 1A.

The above examples in FIGS. 1A-1D are not meant to be limiting. For example, various other types of communication between the devices shown, or other devices, may exist in other embodiments. Also, the methods or functions in the containers are not meant to be limiting. Fewer or more of such methods or functions may exist in other embodiments. Further, various programming languages may be used to implement the program code described herein, including object-oriented programming languages such as Java, C++, C#, Perl, etc.

Figure 3:
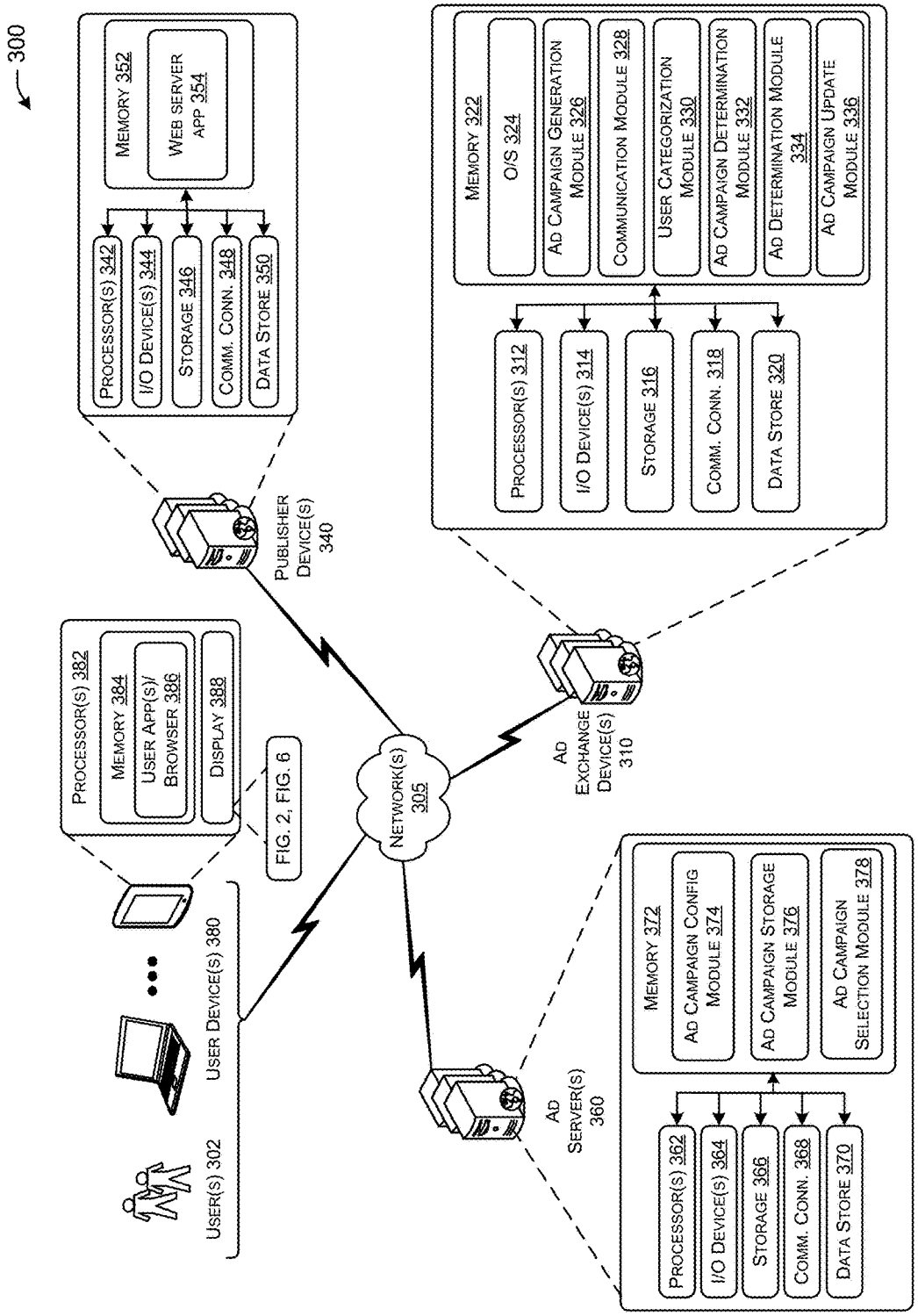
FIG. 3 illustrates an example computing environment for implementing targeted purchases of ad space, according to an embodiment of the disclosure.
Figure 4:
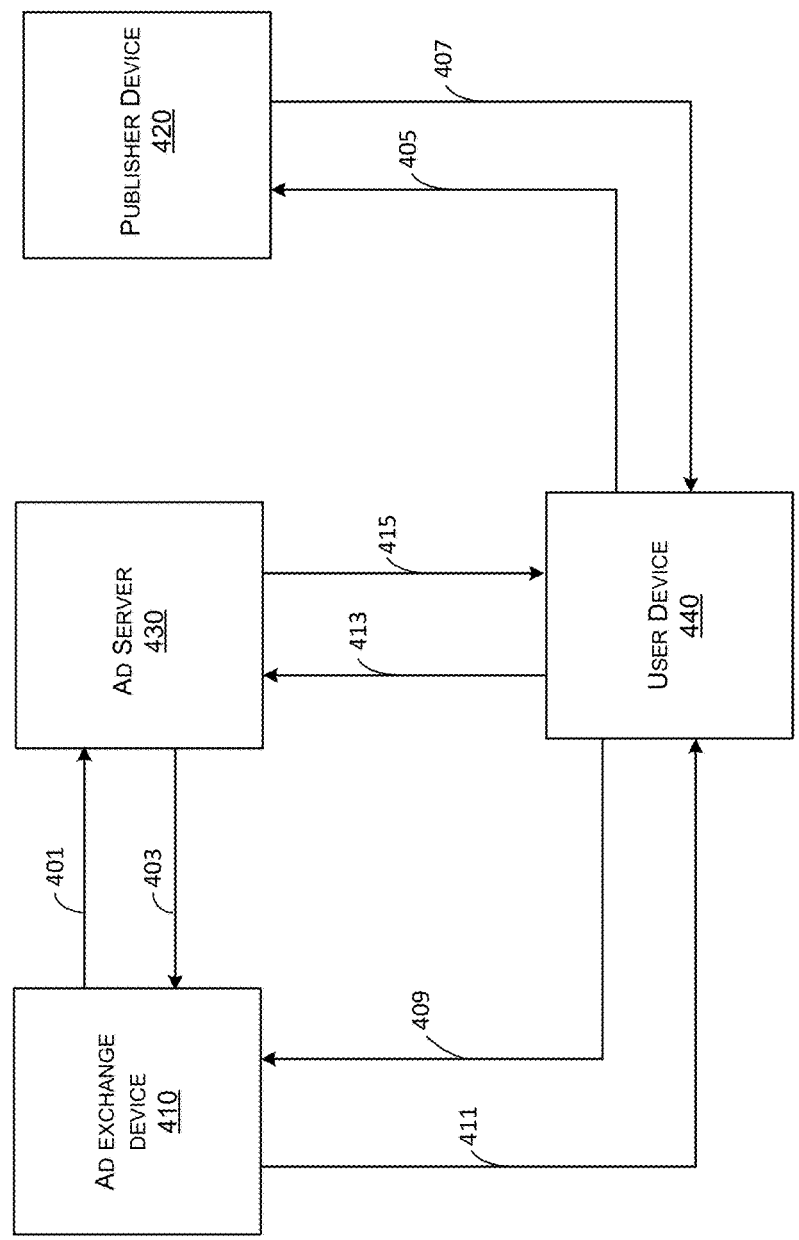
FIG. 4 illustrates a block diagram of an example process for implementing targeted purchases of ad space, according to an embodiment of the disclosure.

FIG. 3 depicts an example computing environment for implementing targeted purchases of ad space via managed relationships, according to an embodiment of the disclosure. As shown, the example computing environment may include, but is not limited to, an ad exchange device 310, a publisher device 340, an ad server 360 associated with the publisher device 240, and a user device 380. Although only one of each device is shown in FIG. 3, more may exist in other embodiments. Each of the devices in FIG. 3 may communicate with one another over one or more networks 305, as described above in FIG. 1A, in one embodiment.

The one or more networks 305 may include any number of wired or wireless networks that can enable various computing devices in the example computing environment 300 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., a publisher device 340 may be directly connected to an ad server 360.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, distribution of software may be downloaded via the Internet.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, mini-computers, transceivers, or customer premise equipment such as set-top boxes, kiosks, or other processor-based devices. The execution of suitable computer-implemented instructions by one or more processors associated with various devices may form special purpose computers or other particular machines that may implement or facilitate targeted purchases of ad space, as described herein.

As used herein, statements that an ad is associated with an ad campaign, or an ad is in an ad campaign, or vice versa, may refer generally to ads that are displayed according to the attributes of the ad campaign. In this way, user activity associated with an ad campaign, for example, may be based on a user's interaction with, purchase of, etc., items or services associated with certain attributes of the ad campaign.

The devices in FIG. 3 may include one or more processors configured to communicate with one or more memory devices and various other components or devices. For example, the ad exchange device 310 may include one or more processors 312 that are configured to communicate with one or more memory or memory devices 322, one or more input/output (I/O) devices 314, storage 316, one or more communication connections 318, and one or more data stores 320. The processor 312 may be implemented as appropriate in hardware, software, firmware, or a combination thereof. The processors 342, 362, and 382 associated with the publisher device 340, the ad server 360, and the user device 380, respectively, may be the same or at least similar to the processor 312, in one embodiment.

The memory 322 of the ad exchange device 310 may store program instructions that are loadable and executable on the processor 312, as well as data generated during the execution of these programs. Depending on the configuration and type of ad exchange device 310, the memory 322 may be volatile, such as random access memory (RAM), and/or non-volatile, such as read-only memory (ROM), flash memory, etc. The memory 352, 372, and 384 associated with the publisher device 340, the ad server 360, and the user device 380, respectively, may be the same or at least similar to the memory 322, in one embodiment.

The storage 316 of the ad exchange device 310 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The storage 346 and 366 associated with the publisher device 340 and the ad server 360, respectively, may be the same or at least similar to the storage 316, in one embodiment.

The memory 322 and the storage 316, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. In some implementations, the memory 322 may include multiple different types of memory, such as static random access memory (SRAM), dynamic random access memory (DRAM), or ROM.

The one or more communication connections 318 may allow the ad exchange device 310 to communicate with other devices, such as the publisher device 340, the ad server 360, the user device 380, databases, user terminals, and various other devices that may exist on the one or more networks 305. In one embodiment, the communication connections 348 and 368 associated with the publisher device 340 and the ad server 360, respectively, may be the same or at least similar to the communication connections 318.

The I/O devices 314 may enable a user to interact with the ad exchange device 310. Such I/O devices 314 may include, but are not limited to, a keyboard, a mouse, a pen, a voice input device, a touch input device, a display, a camera or imaging device, speakers, or a printer. The I/O devices 344 and 364 associated with the publisher device 340 and the ad server 360, respectively, may be the same or at least similar to the I/O devices 314, in one embodiment.

The one or more data stores 320 may store lists, arrays, databases, flat files, etc. In some implementations, the data stores 320 may be stored in memory external to the ad exchange device 310 but may be accessible via the one or more networks 305, such as with a cloud storage service. The data stores 320 may store information that may facilitate targeted purchases of ad space, as described herein. Such information may include, but is not limited to, ads that may be displayed to a user, user activity information (e.g., previous purchases of products or services, an amount of the purchases, the time of the purchases, product discounts or incentives used in the purchases), historical bidding information (e.g., winning bid prices, entities, etc., associated with previously submitted bids), etc. The data stores 350 and 370 associated with the publisher device 340 and the ad server 360, respectively, may be the same or at least similar to the data store 320, in one embodiment.

The memory 322 may also store an operating system 324 and various software applications and/or modules that may implement or facilitate targeted purchases of ad space, as described herein. Example modules may include, but are not limited to, an ad campaign generation module 326, a communication module 328, a user/session categorization module 330, an ad campaign determination module 332, an ad determination module 334, and an ad campaign update module 336. Each of these modules may be implemented as individual modules that provide specific functionality associated with implementing targeted purchases of ad space. Alternatively, one or more of the modules may perform all or at least some of the functionality associated with the other modules.

The ad campaign generation module 326 may facilitate the generation of ad campaigns. For example, the ad campaign generation module 324 may provide a user interface that may enable a user utilizing the ad exchange device 310 to create an ad campaign and assign one or more attributes to the ad campaign. As described above, such attributes may include, but are not limited to, the size of the ad campaign, one or more bid prices associated with the ad campaign, the location of the ad campaign on a web page (e.g., above the fold or below the fold), and whether the ad campaign is reserved for a particular advertiser. The ad campaign generation module 324 may also store such information in a database or data store (e.g., data store 320), as non-limiting examples. The information may be stored in a format such that the ad server 360 may parse the information to identify fields and associated values. Example formats may include, but are not limited to, extensible markup language (XML) format, CSV format, or other text formats that may include one or more delimiters that may facilitate extraction of information from the messages. An example of a delimited format is described above in FIG. 1A, in which field value pairs are separated by a colon (e.g., "location: buy box," "size: 300×250"). For example, the colon separated the field "location" from the value "buy box."

In addition to storing attributes associated with ad campaigns, the ad campaign generation module 324 may generate a unique identification code such that each generated ad campaign may be uniquely identified and stored with its associated ad campaign attributes, according to one embodiment.

The communication module 328 may configure the ad exchange device 310 to communicate with the devices shown in FIG. 3. For example, the communication module 328 may send the ad campaign information generated and stored by the ad campaign generation module 324 to the ad server 360 to facilitate establishment of the ad campaigns with a publisher. As another example, the communication module 328 may send a message that includes a command that, when executed by the ad server 360, may activate one or more ad campaigns. In one embodiment, such commands may be embedded in hypertext markup language (HTML), XML, other markup languages, or other program code sent from the ad exchange device 310 to the user device 380. The communication module 328 may also enable the ad exchange device 310 to receive communications, such as response messages from the ad server 360 associated with establishing ad campaigns, and requests for ads for display on a web page.

Various communication protocols may be utilized by the communication module 328 to facilitate communication with the devices in FIG. 3. Example protocols may include Hypertext Transfer Protocol (HTTP), Transmission Control Protocol/Internet Protocol (TCP/IP), socket-based protocols such as the WebSocket protocol, or other message formats and/or rules for exchanging information between computing devices to support communication between web-based program code and client-server-based program code, as examples. Additional protocols may include Simple Mail Transfer Protocol (SMTP) or other electronic mail formats for transmitting messages via electronic mail and one or more text formats for supporting e-mail via text messaging to or from a user device 380. In one embodiment, the communication module 328 may include one or more application programming interfaces (APIs) that may utilize such protocols to facilitate communication between the ad exchange device 310 and the devices shown in FIG. 3.

The user categorization module 330 may categorize user information into groups based on various information, such as an identification for the user (e.g., based on a cookie associated with a user device 380), a user's demographic information, personal information, browse history, search history, session history, purchase history, location, etc. Users who have the same zip code, for example, may be grouped into the same category. A user's zip code may suggest a user's preference and/or ability to purchase certain products or services and thus may facilitate the targeted purchasing of ad space. In some examples, groups may be based on combinations of information, such as zip code, age, and occupation, such that users belonging to the same zip code, and having the same age and occupation, may be grouped together. Numerous other information may be used to establish groups in other examples.

The user categorization module 330 may also create groups based on information associated with cookies stored on user devices 380. For example, groups may be created based on web pages visited by users utilizing the user devices 380, actions performed by the users (e.g., which buttons or links were selected), products or services purchased during the communication session, or other historical activity information. As an example, communication sessions during which the same web pages were accessed may be categorized in the same group. Groups based on web pages previously accessed may indicate an interest in certain products or services shared by members of the group. As another example, communications sessions that occurred during a particular time period (e.g., between 1:00 PM and 2:00 PM) may be assigned to the same group. Groups may also be based on identification of a user account, information associated with the user account, purchase history, ship to addresses, search history, etc., in other examples. Numerous other examples may exist in other embodiments.

The ad campaign determination module 332 may determine one or more ad campaigns to use in connection with a user. In one embodiment, the determination may be based on a category or group to which a user belongs, e.g., as determined by the user categorization module 330. In one embodiment, an ad campaign may be predetermined for a particular group. Various criteria may be used to determine to which groups an ad campaign may be associated. Such criteria may include, but is not limited to, the likelihood that members of a group will purchase a product or service if presented an ad associated with an ad campaign. For example, ad campaigns having attributes that include a relatively large size and a prominent location on a publisher's web page may be associated with a group that includes members who have purchased a relatively large amount of products or services. As another example, if a user has an account that includes abundant information, such as searches for products, baskets, etc., and an ad campaign for a product in the user's basket has been identified, a relatively high bid price may be submitted for the largest and most prominent ad campaign. Numerous other examples may exist.

The ad campaign determination module 332 may also generate a message that includes a command that, when executed, may activate, turn on, or invoke at the ad server 360 one or more ad campaigns identified in the command. The command may include a source code name and one or more parameters associated with the source code. Such parameters may include an ad campaign for activation and/or one or more attributes associated with an ad campaign. An example command may be as follows: "http://adserver.domain.com/adcampaign.js?id=ABC&price=7, where "adserver" refers to the destination ad server, "adcampaign" is the source code name, "id=ABC" is a first parameter indicating that ad campaign "ABC" should be activated, and "price=7" is a second parameter indicating a bid price of $7 for ad campaign ABC. In this way, source code parameters may include key/value pairs to specify criteria for presenting ads desired by the ad exchange device 310. Numerous other commands, including different parameters, numbers of parameters, etc., may exist in other examples.

In one embodiment, the ad campaign determination module 332 may embed the above example command in HTML or other code, which may be sent to the user device 380. Upon a browser or dedicated application 286 executing the HTML or other code, the command may be sent to the ad server 360. The ad server 360 may receive and process (e.g., execute) the command, which in turn may cause activation of one or more ad campaigns that may be indicated in the command. In one embodiment, the command may be based on JavaScript, HTML, XML, or other code or programming languages. According to certain embodiments herein, the ad campaign determination module 330 may format commands such that the ad server 360 may execute them upon receipt. In this way, the ad campaign determination module 330 may inject commands into the ad server 360 for execution. Various ad server software may enable such injection, such as OpenX, DoubleClick for Publishers (DFP), and Application Object Server (AOS), as non-limiting examples.

As an alternative to configuring the user device 380 to communicate with the ad server 360, the ad campaign determination module 330 may communicate directly with the ad server 360 to activate one or more ad campaigns, in other embodiments.

The ad determination module 334 may determine one or more ads for presentation in ad space associated with a web page being presented to a user 302 or a user device 380. In so doing, the ad determination module 334 may consider various information that may facilitate the determination. Such information may include, but is not limited to, text or keywords present in the content of a web page being accessed by the user device 380, information about a user accessing the web page, etc. Such information may be utilized by the ad determination module 334 to determine a relatedness between web page content, the user, etc., and potential ads that may be displayed on the web page. Ads that are determined to be related to the web page content and/or the user may be selected for presentation in the ad space associated with the web page.

The ad campaign update module 336 may update information associated with an ad campaign. In one embodiment, such updates may be performed in response to the ad exchange device 310 receiving information associated with an auction for ad space on a web page. The received information may indicate a winning bid price, a wining entity, the placement of the ad (e.g., buy box), etc. In one embodiment, the ad campaign update module 336 may adjust the price associated with an ad campaign, for example, to increase the possibility that the ad campaign will be selected during successive bids for the ad space. Various other information associated with an ad campaign may be updated in response to receiving information about auctions, user information, communication session information, etc., in other embodiments. Similarly, if bids for ad space on a particular web page are repeatedly unsuccessful, the web page may no longer be targeted for distributing ads.

As described above, the ad exchange device 310 may communicate with the ad server 360 to establish ad campaigns, among other functions. A campaign configuration module 374 of the ad server 360 may perform various functions to facilitate the establishment of ad campaigns. One such function may include receiving information associated with ad campaigns from the ad exchange device 310. Such information may include attributes associated with the ad campaigns, such as the location of ads associated with the ad campaigns, the size of the ads, a price for the ad campaign, etc.

After receiving the above information, the campaign configuration module 374 may parse the received information to identify fields and values associated with an ad campaign. Such fields and values may be validated by the campaign configuration module 374 based on various criteria. For example, a unique identification code for an ad campaign may be verified to ensure its uniqueness, a location identifier (e.g., "buy box," "homepage-top" indicating that ads will be displayed at the top of the homepage, etc.) may be verified to make sure that it is valid, the size may be verified to ensure that it is appropriate given available layout space on a web page, as well as various other checks or verifications. In some embodiments, the campaign configuration module 374 may more generally verify that received ad campaigns have valid values for each of their attributes.

If a received ad campaign is successfully verified, then the ad campaign may be stored (e.g., by the ad campaign storage module 376 of the ad server 360) as a candidate campaign for use in presenting an ad for an ad device associated with the ad campaign, such as the ad exchange device 310. A response message indicating that the request to create or establish an ad campaign was successful may be sent to the ad exchange device 310. If the received ad campaign is not successfully verified, then the ad campaign storage module 376 may not store the ad campaign as a candidate campaign, and a response message may be sent to the ad exchange device 310 indicating that the request to create the ad campaign was not successful. As will be described in greater detail below, the ad exchange device 310 may modify its request based on the response message.

The ad campaign selection module 378 may select an ad campaign among multiple ad campaigns associated with various advertisers. Such ad campaigns may be stored as ad campaigns 152 in the data store 370, in one embodiment. To facilitate selection of an ad campaign for an ad space in a web page of the publisher, the ad server 360 may rank each of the ad campaigns according to certain criteria, such as, but not limited to, an amount of revenue expected to be generated by each ad campaign, the frequency of selection of ads in the ad campaigns, and a particular time period during which the ads associated with the ad campaigns may be displayed. In one embodiment, the highest ranked ad campaign may be selected. The ad campaign selection module 378 may further embed program code commands in HTML or other program code such that when content associated with the HTML or other program code renders at the user device, a request for one or more ads to display according to the ad campaign may be sent to retrieve the ads, such as to the ad exchange device 310, a winning ad device, or third party ad server. The ad campaign selection module 378 may further send a code to a winning bidder (e.g., the ad exchange device 310) that may enable the winning bidder to render an ad on a web page for which a bid to present an ad was submitted, for example, by activating one or more ad campaigns associated with the ad. Such a code may be established by the campaign configuration module 374 and shared with the ad exchange device 310 (e.g., the ad campaign generation module 326), in one embodiment.

The publisher device 340 may include a web server application 364, which may serve web pages to user devices 380. The web server application 364 may also insert program code or commands into HTML or other markup code, for example, that may be called or invoked to cause the user devices 380 to communicate with the ad exchange device 310. Various other functionality may be provided by the web server application 364 to implement or facilitate the exchange of information between devices in communication with the publisher device 340, in other embodiments.

Figure 6:
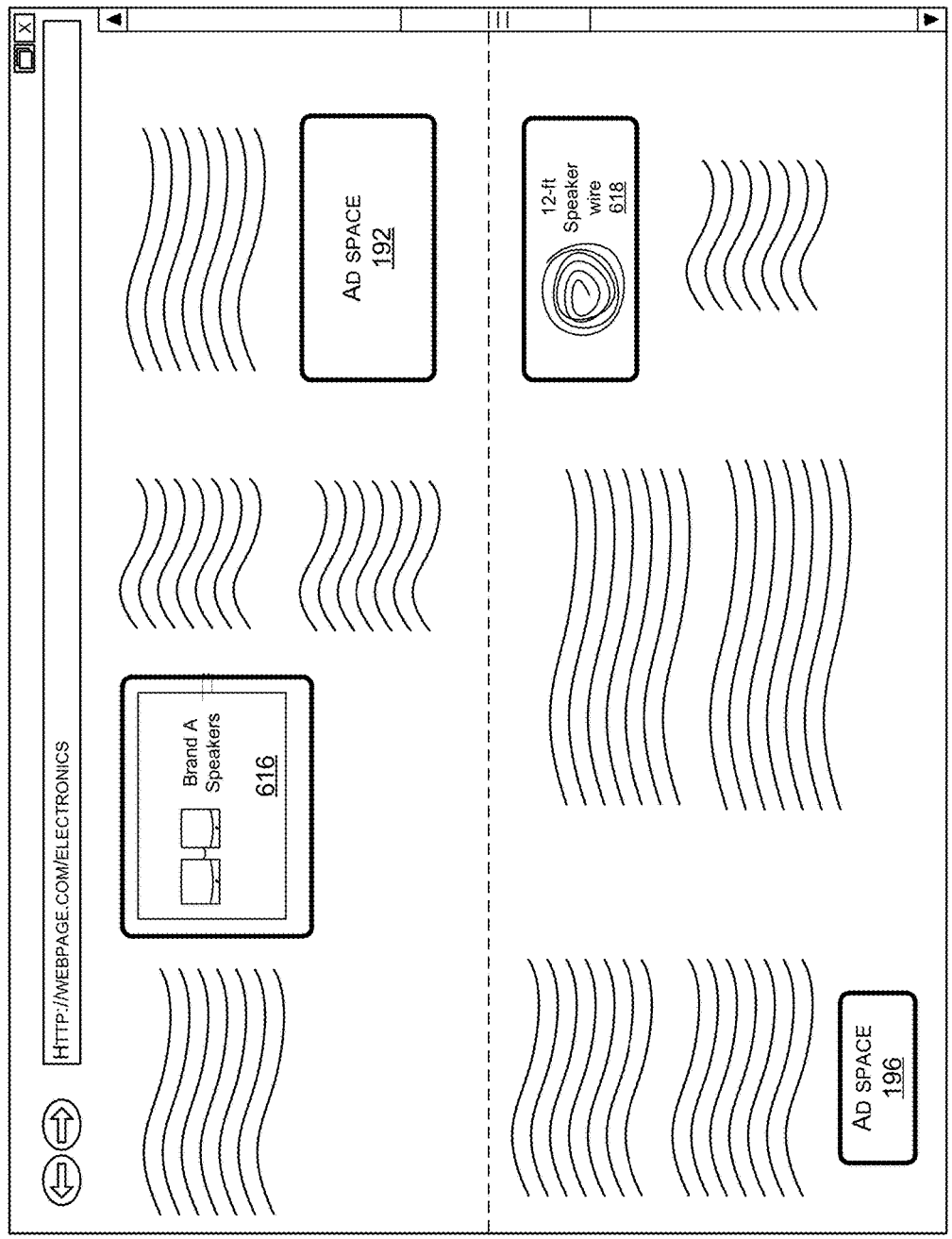
FIG. 6 illustrates the example web page content in FIG. 2 along with ads that are selected for display to a user, according to an embodiment of the disclosure.

A user device 380 may include one or more user applications 386 that may receive and display ads and other web page content for a user utilizing the user device 380. In one example, a user application 386 may include a dedicated application or a web browser application, either of which present web pages or other content via a display 388, such as that shown in FIG. 2 and FIG. 6. As described, the web page or content may include program code that may configure the user device 380 to send various information to other devices on a network, such as the ad exchange device 310 and the ad server 360. Such program code may include an iframe tag embedded within HTML, JavaScript, or other program code, in one embodiment. Techniques other than iframe tags may be employed to communicate information between devices, in other embodiments. According to one example, program code associated with an iframe tag may cause the user device 380 to send information to the ad exchange device 360, where an ad campaign may be determined based on information associated with the user device 380 and/or the user utilizing the user device 380. In another example, the program code associated with an iframe tag may direct the user device 380 to send a program code command and one or more parameters to the ad server 360 that may cause activation one or more ad campaigns when executed.

The above configurations in FIG. 3 are not meant to be limiting. Numerous other configurations, devices, etc., may exist. Further, the processes described in FIG. 3 may not be limited to the particular device shown in FIG. 3. The processes may be located at different devices or may be distributed across multiple devices. For example, functionality associated with determining ad campaigns and/or ads by the ad exchange device 310 (e.g., the ad campaign determination module 332 and the ad determination module 334) may be performed by the ad server 360, the user device 380, and a web server intermediary device (not shown), such as the web server intermediary 170 in FIG. 1D.

4 depicts a block diagram of an example process for implementing targeted purchases of ad space as described herein. Such implementation may involve communication between the ad exchange device 410, the publisher device 420, the ad server 430, and the user device 440, in one embodiment. The implementation may begin with an ad exchange device 410 communicating with the ad server device 430 to establish one or more ad campaigns, as illustrated by communication 401. Such communication may include the ad exchange device 410 providing attributes associated with the ad campaigns to the ad server 430, where the attributes may be verified.

As an example, the ad campaigns shown in FIG. 2 may be represented by the following information sent from the ad exchange device 410 to the ad server 430, e.g., via the ad campaign generation module 326. To establish ad campaign 190, the ad exchange device 410 may send a message "id=ABC; location=buy box; type=banner; size=350×350; price=$7," where "ABC" is a unique identifier for the ad campaign 190, "buy box" is the most prominent location for displaying an ad on a web page, "banner" is the type of ad to be displayed, "350×350" is the size of the ad, and $7 is the price an advertiser associated with the ad exchange device 410 is willing to bid for an opportunity to display an ad according to the attributes associated with ad campaign ABC. In some examples, the ad exchange device 410 may specify multiple prices (e.g., $5, $7, $9) for the same ad campaign. The bid price may vary based on analysis of information associated with a user, such as demographic information, purchase history, browser history, preferences, etc., as determined by the ad exchange device 410.

Continuing with the present example, to establish ad campaign 192, the ad exchange device 410 may send a message including "id=DEF; location=above the fold; type=banner; size=350×200; price=$4." To establish ad campaign 194, the ad exchange device 410 may send message "id=GHI; location=reserved; type=banner; size=300×100; price=$3.50," where "reserved" may indicate that the specified ad campaign is reserved for an advertiser associated with the ad exchange device 410. To establish ad campaign 196, the ad exchange device 410 may send the message "id=JKL; location=below the fold; type=banner; size=200×100; price=$1." Numerous other parameters, values, etc., may be specified in other examples to facilitate creating an ad campaign in other embodiments.

The ad server 430 (e.g., via the ad campaign configuration module 254), may determine whether the requested ad campaigns are valid. If the ad campaigns are valid, the ad server 430 may store the ad campaigns for future activation or participation in auctions for ad space. The ad server 430 may also send a response message (via communication 403) indicating that the request to establish the ad campaigns was successful. If an ad campaign is invalid, the ad server 430 may send a response message that indicates that the request to establish the ad campaigns has been rejected. Such a response message may include, among other information, an error code, which may indicate a reason for the rejection of a request to create the ad campaign. In response, the ad exchange device 410 may parse the response message to obtain the error code, identify the cause of the rejection, modify its request based at least in part on the error, and resend the modified request via communication 401.

440 may request web page content provided by the publisher device 420 via communication 405. The publisher device 420 may send HTML, XML, other markup languages, or program code that renders a web page when executed by a browser (e.g., the browser 386 in FIG. 3) at the user device 440, via communication 407. The publisher device 420 may embed a function call in the markup language or program code sent to the user device 440 such that when the web page is rendered, the functions may be executed by a browser or other program on the user device 440. For example, a function may instruct the user device 440 to call the ad exchange device 410. The call to the ad exchange device 410 may include information associated with the user and/or the user device, such as information in a cookie (e.g., an identification of the user device 440), a user's purchase history, browse history, profile information, search terms, etc.), text associated with the web page, a URL associated with the web page, and information associated with ad space on the web page (e.g., location of the ad space (e.g., "homepage-top"), size of the ad space, etc.), as non-limiting examples. At least a portion of the web pages provided by the publisher device 420 may include a call to the ad exchange device 410 and/or other ad devices.

In one example, the publisher device 420 may embed a function call in the "website.com/electronics" web page shown in FIG. 2 that may cause the user device 440 to communicate with the ad exchange device 410, as indicated by communication 409. In association with the user device 440 calling the ad exchange device 410, the ad exchange device 410 may receive various information identifying the user (e.g., "user information"). Such user information may be used to determine one or more ad campaigns for presenting one or more ads on the electronics web page. Examples of user information may include, but is not limited to, information identifying a user (e.g., a cookie associated with the user device 440), and prior activity of the user, such as browse history, product purchase history, search terms entered to locate content on web pages, etc. Such information may indicate historical activities associated with the user device 440, such as web pages visited by the user device 440 and links or buttons selected, as non-limiting examples. The ad exchange device 410 (e.g., via the ad campaign determination module 332 in FIG. 3) may determine whether at least a portion of the user information matches a category or group established by the user categorization module 330 in FIG. 3, in one embodiment. Such a group may have a predefined ad campaign assigned to or otherwise associated with it, in one embodiment.

In the present example, the ad exchange device 310 may determine that cookie information associated with the user device 340 matches Group A. According to one example, Group A may include cookie information that indicates that the user has made more than a dozen purchases of electronics equipment within the last seven days. The ad exchange device 410 may further determine that, based on the received text associated with the web page, the user device 440 is currently accessing information about speakers for a stereo receiver, which the cookie information also indicates was purchased within the last seven days. Based on these and/or any number of other suitable criteria, such as the likelihood that the user will purchase a product associated with an ad for electronics equipment, the ad exchange device 410 (e.g., via the ad campaign determination module 332) may determine that ad campaign 190 in FIG. 2, for example, should be activated. In the present example, the ad campaign 190, which may be associated with the most prominent location on a web page, may be selected because there may exist a relatively high likelihood that users in Group A will purchase products, and therefore, placing an ad in the most prominent location on a web page may justify a relatively higher bid price. Numerous other examples, considerations, and/or criteria may be used in other embodiments to determine which ad campaigns to activate.

After identifying an ad campaign, the ad exchange device 410 may generate and then communicate a message that may include a command that, when executed by the ad server 430, may cause the ad server 430 to activate ad campaigns indicated or referenced in the message. Such a message may be embedded in markup language or program code sent from the ad exchange device 410 to the user device 440, via communication 411. In one embodiment, the message may include the name of a source code program and one or more parameters. An example command that may activate ad campaign 190 for the "webpage.com/electronics" web page may be http://webpage.com/electronics/adcampaign.js?id=ABC&price=7, where "webpage.com" may refer to the ad server 430, "electronics" may refer to the web page content being accessed at webpage.com, "adcampaign.js" may refer to the program code on the ad server 430 that may activate ad campaigns, "ABC' may refer to the ad campaign to activate, and $7 may refer to the bid price associated with ad campaign ABC.

In some examples, attributes associated with an ad campaign may be specified as a parameter instead of, or in addition to, the ad campaign identification code (e.g., ABC). For example, command http://webpage.com/electronics/adcampaign.js? location=reserved& price=5, where "reserved" indicates that the ad exchange device 410 desires to activate ad campaign 192, which is for an ad space that was established as being reserved for the ad exchange device 410 in the present example, and where $5 indicates the bid price for the reserved ad campaign. In some embodiments, ad campaign attributes may be altered by specifying one or more parameters by the ad exchange device 410. For example, even though a bid price of $4 was established for ad campaign 192, as described above, the bid price may be changed via the parameter "price=5" above. Numerous other examples may exist in other embodiments.

Information in addition to the above command may also be sent in the communication 411 from the ad exchange device 410 to the user device 440. Such information may include, but is not limited to, ad data, which may include information identifying a user (e.g., a cookie identifier associated with the user device 440), HTML or other code for an ad that may be displayed on a web page for the user, ad campaigns according to which the ad may be presented to the user, publisher information, criteria or conditions that may facilitate the selection of ad campaigns and ads, etc.

In some embodiments, as described above, ad campaigns may be activated via commands sent from devices other than the user device 440. For example, the ad server 430 or other device (e.g., the web server intermediary 170 in FIG. 1D), may also cause activation of ad campaigns by sending commands that are the same or similar to those described above.

As described, the user device 440 may communicate messages or commands received from the ad exchange device 410 to the ad server 430, as indicated by communication 413. Such commands may be processed by the user device 440 to, for example, add or remove information prior to sending the message to the ad server 430. Upon receiving a command from the user device 440, the ad server 430 may execute the command, which may in turn activate, invoke, or turn on one or more ad campaigns referenced in the command. Such activation may effectively submit the one or more ad campaigns for a bid in an auction for ad space. An example of such activation is described in greater detail in FIG. 5.

Upon selecting at least one of the one or more ad campaigns, the ad server 430 may send a code that may authorize the user device 440 to render an ad on a web page (via communication 415). The user device 440 may use the code to render an ad that may have been predetermined and provided in the ad data sent in communication 411, in one embodiment. In some embodiments, the ad server 430 may send a request for an ad to the ad exchange device 410, which may determine an ad and send the ad to the user device 440 for display. An example of the display of particular ads associated with the ad exchange device 440 in association with the ad exchange device 440 winning an auction is described below in association with FIGS. 5 and 6.

Figure 5:
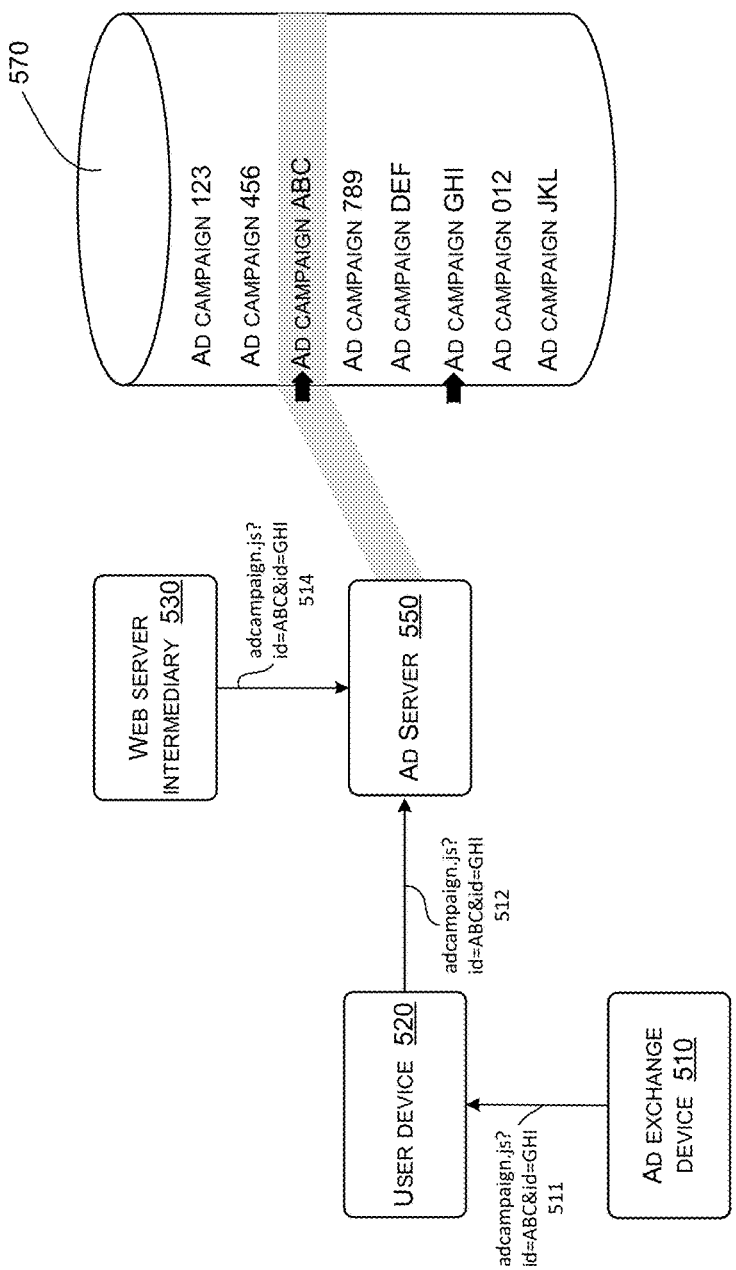
FIG. 5 illustrates a block diagram of the activation and selection of ad campaigns in association with targeted purchases of ad space, according to an embodiment of the disclosure.

FIG. 5 depicts an example of the activation and selection of ad campaigns in association with targeted ad buys, according to an embodiment of the disclosure. The ad server 550 may collect ad and/or ad campaign offers or bids from various ad exchange devices or the like. Such ads may be stored in the database 570, or other storage mechanism, and may include ad campaigns ABC, DEF, GHI, and JKL associated with the ad exchange device 510. Additional ad campaigns that may be established by other advertisers may also exist. Such ad campaigns are indicated by three-digit numbers to distinguish them from ad campaigns associated with the ad exchange device 510.

The ad server 550 (e.g., via the ad campaign selection module 378) may rank available ads and/or ad campaigns according to various criteria, such as bid price, contractual relationships (e.g., an agreed upon number of ads that must be shown), or any number of other criteria. As an example, ad campaigns 123 and 456 may be ranked higher than ad campaign ABC associated with the ad exchange device 510 because it may be determined that ad campaigns 123 and 456 are likely to generate more revenue than ad campaign ABC and the other ad campaigns listed below these ad campaigns. As another example, ad campaigns may be ranked based on quotas for displaying ads for advertisers. Ad campaigns for which the ad server 550 has a greater number of ads to present to meet a quota may be ranked higher than ad campaigns for which the ad server 550 has a lower number of ads to present to a meet a quota, or vice versa, in some examples.

As described, the ad exchange device 510 may cause activation of one or more ad campaigns based on user information. According to one example, the ad exchange device 510 may cause activation of ad campaign ABC (e.g., the most prominent location on the electronics web page) and ad campaign GHI (e.g., ad space that is reserved for the ad exchange device 510) by sending command 511 to the user device 520, which may in turn send the command 512 to the ad server 550. The ad server 550 may perform or execute the command to activate, turn on, or otherwise submit bids for ad campaigns ABC and GHI. In some embodiments, the ad exchange device 510 may communicate the command 511 directly to the ad server 550, which may also send direct communication to the ad exchange device 510, such as a request for an ad to display in ad space in association with the ad exchange device 510 winning an auction for ad space.

According to another example, the user device 520 may send the command 512 to the ad server 550 via a container (e.g., the container 184 in FIG. 1B) based on a schedule, as described above, to activate ad campaigns ABC and GHI.

According to this example, the user device may not require receipt of the command 411 from the ad exchange device 510. According to a further example, a web server intermediary 530 may send a command 514 to the ad server 550 via a container (e.g., the container 172 in FIG. 1D) to activate the ad campaigns ABC and GHI. In any of these examples, the ad server 550 may execute the command to activate the ad campaigns ABC and GHI (as indicated by the arrows pointing to such ad campaigns), which may submit the ad campaigns ABC and GHI in an auction for ad space, for example, on the electronics web page shown in FIG. 6. If the auction is won, a speakers ad 616 may be displayed in association with ad campaign 190 (identification code "ABC"), and speaker wire ad 618 may be displayed in association with ad campaign 194 (identification code "GHI"), according to the example shown in FIG. 6.

Figure 7:
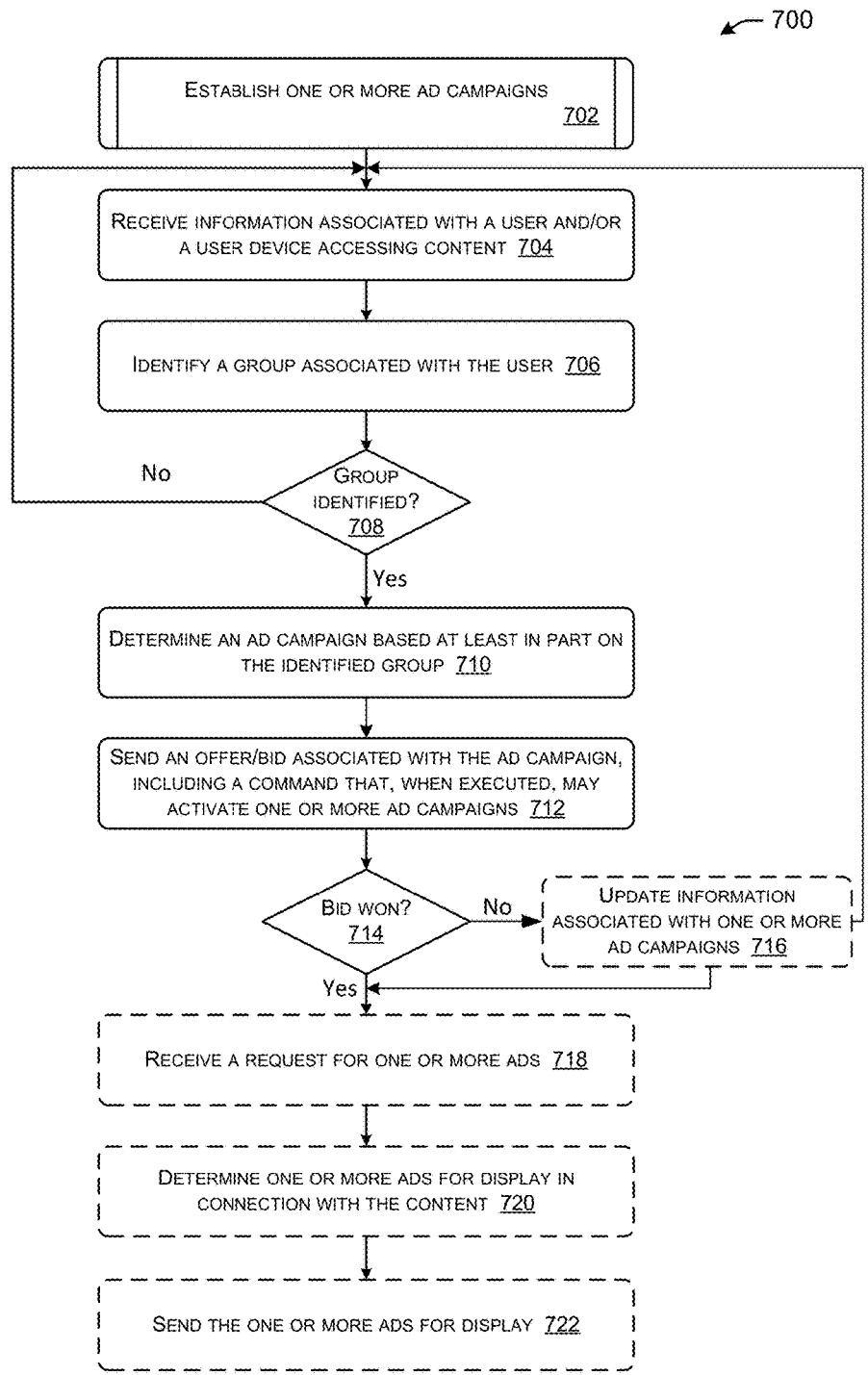
FIG. 7 illustrates a flow diagram of an example process for targeted purchases of ad space using a web browser at a user device to activate one or more ad campaigns, according to an embodiment of the disclosure.

FIG. 7 depicts a flow diagram of an example process for targeted purchasing of ad space via managed relationships, according to an embodiment of the disclosure. The example process may be performed by the ad exchange device 310 in FIG. 3, in one embodiment. The example process may begin at block 702, where one or more ad campaigns may be established (e.g., by the ad campaign generation module 326). The processes associated with establishing the one or more ad campaigns will be described in greater detail in association with FIG. 8.

Information associated with a user and/or a user device (e.g., a cookie) accessing content may be received, at block 704. Such information may be received as a result of a publisher inserting program code, a command, or other instruction that instructs the user device to communicate with the ad exchange device and may also instruct the user device to access and send various information to the ad exchange device, such as the cookie identifier, a URL associated with a web page on which the content is displayed, information associated with the publisher providing the content, and information associated with ad space on a web page that includes the content (e.g., location of the ad space, size of the ad space, etc.), among other information. Such information may be used to determine an ad campaign, as described at block 710. In some examples, information other than that provided in a cookie may be used to identify a user.

A category or group associated with the user and/or the user device may be identified at block 706, e.g., via the ad campaign determination module 332. If a group associated with the received information is identified, at block 708, then an ad campaign based at least in part on the identified group may be determined, at block 710. In one embodiment, one or more ad campaigns may be predefined for a group based on a likelihood that members of the group will purchase ads associated with the ad campaign. If a group associated with the received information is not identified, then processing may return to block 704, where information associated with a user accessing a content page may be received.

If a bid is not won in association with activating the one or more ad campaigns, at block 714, then information associated with the one or more ad campaigns may be updated (e.g., via the ad campaign update module 336), at block 716. Information associated with a winning advertiser, such as the winning bid price, the location of the winning ad, the size of the winning ad, the web page on which the winning ad is displayed, etc., may be utilized to update an ad campaign to, for example, increase the possibility that the ad campaign may win a bid on successive attempts. For example, if a bid price associated with an ad campaign was lower than the winning bid price, then the bid price associated with the ad campaign may be increased. As another example, if bids associated with particular web pages are repeatedly unsuccessful, then ad campaigns may no longer be activated for such web pages. Numerous other examples may exist.

If the bid was won at block 714, then a request for one or more ads may be received, at block 618. One or more ads for displaying on the web page being accessed by the user may be determined (e.g., by the ad determination module 334), at block 720. The one or more ads may be sent for display on the web page, at block 722.

Figure 8:
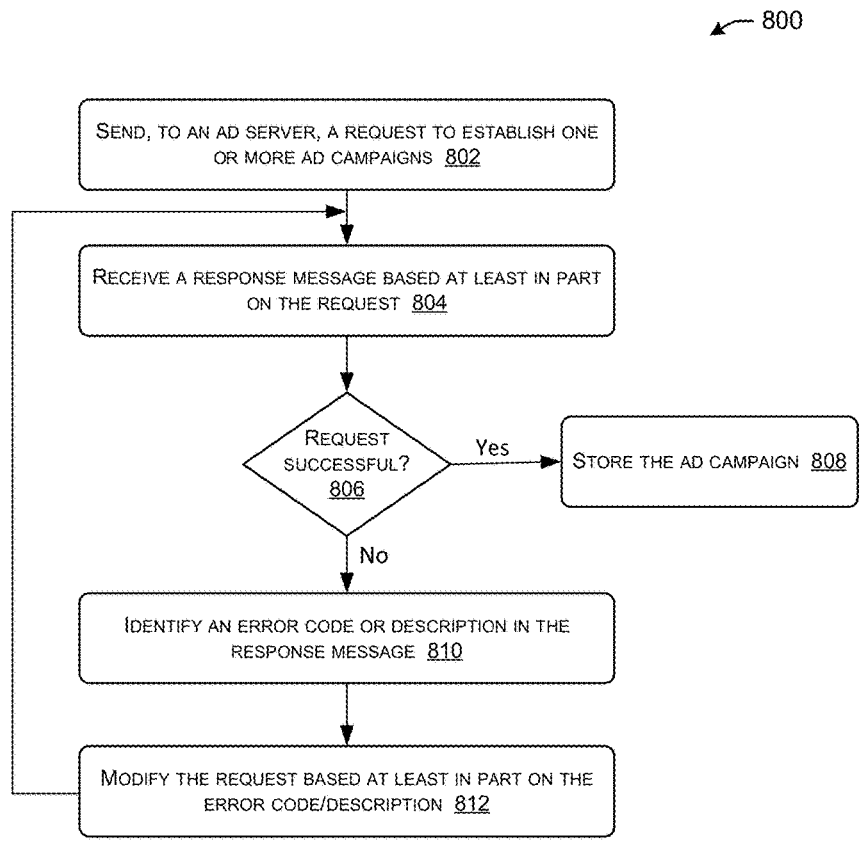
FIG. 8 illustrates a flow diagram of an example process for establishing one or more ad campaigns, according to an embodiment of the disclosure.

FIG. 8 depicts a flow diagram of an example process for establishing one or more ad campaigns, according to an embodiment of the disclosure. The example process may be implemented by the ad exchange device 310 in FIG. 3, in one embodiment. The example process may begin at block 802, where a request to establish an ad campaign (e.g., as indicated by program code or a command that may include parameters indicating ad campaigns) may be sent to an ad server, e.g., the ad server 360 in FIG. 3, in one embodiment. A response message based at least in part on the request may be received, at block 804.

If the request was successful, at block 806, then the ad campaign may be stored, at block 808. A response message indicating a successful establishment of the ad campaign may be received at the ad exchange device from the user device, at block 810. If the request was unsuccessful, then an error code in the response message may be identified, at block 810, and the request to establish an ad campaign may be modified based at least in part on the error code, at block 812. Processing may thereafter return to block 802, where the modified request to establish an ad campaign may be sent to the ad server for verification.

Figure 9:
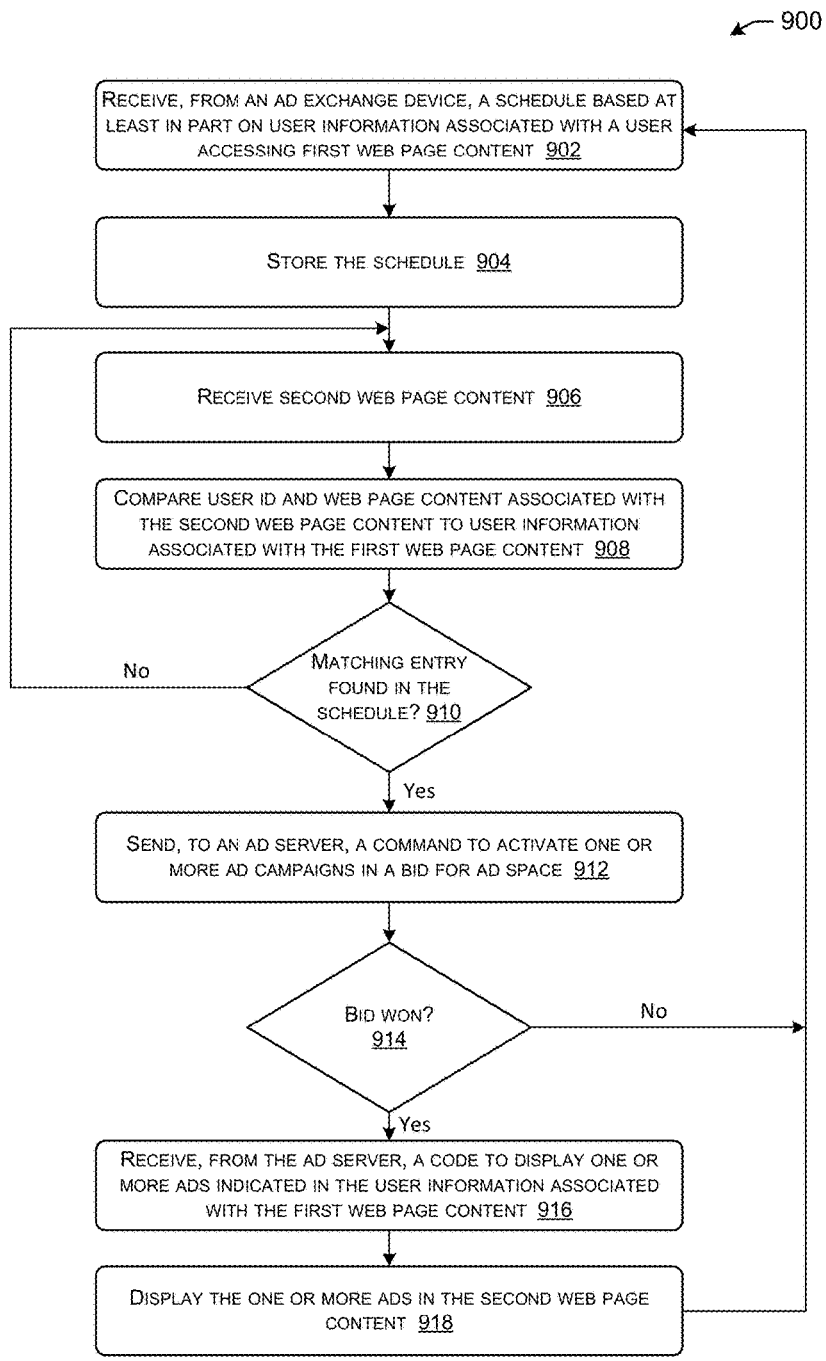
FIG. 9 illustrates a flow diagram of an example process for targeted purchases of ad space according to a schedule, in one embodiment of the disclosure.

FIG. 9 depicts a flow diagram of an example process for targeted purchases of ad space according to a schedule, in one embodiment of the disclosure. The example process may be performed by the user device 180 in FIG. 1B or the web server intermediary 170 in FIG. 1D, in some embodiments. The example process may begin at block 902, where a schedule based at least in part on user information (such as that described above) associated with a user accessing web page content may be received. The schedule may be stored, at block 904, and used to determine whether an ad campaign or ad should be presented to a user based on the user's future requests for web page content, which may be received at block 906.

Information associated with the requested web page content (e.g., the user or cookie identification and the web page content (e.g., the URL corresponding to the web page), various criteria, etc., may be compared to the information in the schedule to determine whether a matching entry exists in the schedule, at block 908. A matching entry may indicate that the ad exchange device (e.g., the ad exchange device 110 in FIGS. 1B and 1D) may desire to present an ad to the user who requested the web page content. The entry may have been established in the schedule based on a previously successful (or missed) opportunity to present an ad to the same user (on the same web page, in one embodiment). If a matching entry is not found, at block 910, then processing may return to block 906, where future or successive requests for web page content may be received.

If a matching entry in the schedule is found, and the criteria or conditions (such as those described above) are met, then a string or command may be sent to an ad server (e.g., the ad server 160 in FIGS. 1B and 1D) to activate an ad campaign identified or referenced in the command, at block 912. Activation of the ad campaign may cause a bid for the ad campaign to be submitted in an auction. If the bid is won, at block 914, then a code that may enable presentation of an ad determined by the ad exchange device 310 in FIG. 3 (e.g., via the ad determination module 334) may be received (at block 916) and used to display the determined ad in the requested web page content at a user device (e.g., the user device 180 un FIGS. 1B and 1D) associated with the user (at block 918).

The operations and processes described and shown above may be carried out or performed in any suitable order as desired in various implementations. Additionally, in certain implementations, at least a portion of the operations may be carried out in parallel. Furthermore, in certain implementations, less than or more than the operations described above may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:

sending, to a publisher device, a first ad campaign for displaying an ad on web pages;

receiving, from a user device that is accessing a web page associated with the publisher device, a first message comprising information associated with a web page and user information that is associated with at least one of the user device or a user account associated with the user device;

identifying, based on the user information, a group from a plurality of groups, wherein the group is associated with at least one of the user device or the user account;

determining that the first ad campaign is associated with the group;

sending, to the user device, a first command comprising a source code identifier corresponding to the first ad campaign and a first parameter, wherein the first command and the first parameter are embedded in a code for rendering web page content, the first parameter identifying attributes associated with the first ad campaign, wherein the first command is configured to cause an ad server associated with the publisher device to activate the first ad campaign to submit a bid for displaying an ad on the web page according to the ad campaign;

receiving a second message from the ad server indicating that the first command was unsuccessful at activating the first ad campaign;

generating a second command corresponding to a second ad campaign, the second command comprising a second parameter based at least in part on the second message;

sending, to the user device, the second command;

receiving, based on activation of the second ad campaign by the ad server, a request for an ad to be displayed on the web page;

determining the ad from a plurality of ads based at least in part on the second ad campaign; and sending the ad to the user device for display on the web page, wherein the ad is displayed according to the second ad campaign.

2. The one or more non-transitory computer-readable media of claim 1, wherein the group is identified from multiple groups based at least in part on at least one of one or more web pages visited by the user device, purchase history associated with the user device, or demographic information associated with the user account.

3. A system comprising:
at least one memory that stores computer-executable instructions; and
at least one processor configured to access the at least one memory, wherein the at least one processor is configured to execute the computer-executable instructions to:
receive, from a user device, a first message comprising user information associated with a web page accessed by the user device or a user account;
identify a group from a plurality of groups, wherein the group is associated with at least a portion of the user information;
determine one or more ad campaigns based at least in part on the group, wherein the one or more ad campaigns comprise attributes associated with displaying an ad on the web page; and
send, to the user device, a first command comprising a source code identifier corresponding to a first ad campaign and a first parameter, wherein the first command and the first parameter are embedded in a code for rendering web page content, wherein the first parameter identifies attributes associated with the first ad campaign, and wherein the first command is configured to cause an ad server to activate the first ad campaign to submit a bid for displaying the ad on the web page according to the first ad campaign;
receive a second message from the ad server indicating that the first command was unsuccessful at activating the first ad campaign;
generate a second command corresponding to a second ad campaign, the second command comprising a second parameter based at least in part on the second message; and
send, to the user device, the second command.

4. The system of claim 3, the at least one processor further configured to:
receive, from the user device, a request for the ad, wherein the request is received in response to a winning bid;
determine the ad among a plurality of ads based at least in part on the group, wherein the ad is sent to the user device in response to the request; and
send the ad to the user device for displaying on the web page according to the second ad campaign.

5. The system of claim 3, wherein the bid is submitted in an auction, wherein the at least one processor is further configured to:
receive information associated with the auction; and
adjust the bid associated with the second ad campaign based at least in part on the information associated with the auction.

6. The system of claim 5, wherein the at least one processor is further configured to adjust a location associated with second ad campaign based at least in part on the information associated with the auction.

7. The system of claim 3, wherein the user information includes a cookie from the user device.

8. The system of claim 3, wherein the group is identified from multiple groups based at least in part on at least one of one or more web pages visited by the user device, purchase history associated with the user device, or demographic information associated with the user account.

9. A method comprising:
receiving, at an ad device, a first message comprising user information associated with a web page accessed by a user device or a user account;
identifying, by the ad device, a group associated with the user device or the user account;
determine one or more ad campaigns based at least in part on the group, wherein the one or more ad campaigns comprise attributes associated with displaying an ad on the web page;
sending, from the ad device, a first command comprising a source code identifier corresponding to the ad campaign and a first parameter, wherein the first command and the first parameter are embedded in a code for rendering web page content, wherein the first parameter identifies attributes associated with the first ad campaign, wherein the first command is configured to cause an ad server to activate the first ad campaign to invoke a bid for displaying the ad on the web page according to the first ad campaign;
receiving, at the ad device, a second message from the ad server indicating that the command was unsuccessful at activating the first ad campaign;
generating, by the ad device, a second command corresponding to a second ad campaign, the second command comprising a second parameter based at least in part on the second command;
sending, by the ad device, the second command to the user device;
receiving, at the ad device, a request for an ad, wherein the request is received in response to a winning bid; and
sending, from the ad device, the ad for displaying on the web page according to the second ad campaign.

10. The method of claim 9, further comprising:
determining, by the ad device, the ad among a plurality of ads of the second ad campaign based at least in part on the group.

11. The method of claim 10, wherein the group is identified from multiple groups based at least in part on at least one of one or more web pages visited by the user device, purchase history associated with the user device, or demographic information associated with user account of the user device.

12. The method of claim 9, wherein the bid is submitted in an auction, the method further comprising:
receiving, at the ad device, information associated with the auction; and
adjusting, by the ad device, the bid associated with the first ad campaign based at least in part on the information associated with the auction.

13. The method of claim 12, further comprising adjusting, by the ad device, a location associated with the first ad campaign based at least in part on the information associated with the auction.

* * * * *